US012023793B2

(12) United States Patent
Seltmann et al.

(10) Patent No.: US 12,023,793 B2
(45) Date of Patent: Jul. 2, 2024

(54) APPARATUS FOR ADJUSTING A CHISEL

(71) Applicant: Hilti Aktiengesellschaft, Schaan (LI)

(72) Inventors: Daniel Seltmann, Landsberg am Lech (DE); Josef Fünfer, Koenigsbrunn (DE)

(73) Assignee: Hilti Aktiengesellschaft, Schaan (LI)

( * ) Notice: Subject to any disclaimer, the term of this patent is extended or adjusted under 35 U.S.C. 154(b) by 13 days.

(21) Appl. No.: 17/800,556

(22) PCT Filed: Feb. 23, 2021

(86) PCT No.: PCT/EP2021/054419
§ 371 (c)(1),
(2) Date: Aug. 18, 2022

(87) PCT Pub. No.: WO2021/175657
PCT Pub. Date: Sep. 10, 2021

(65) Prior Publication Data

US 2023/0086336 A1 Mar. 23, 2023

(30) Foreign Application Priority Data

Mar. 3, 2020 (EP) .................................... 20160651

(51) Int. Cl.
*B25D 11/06* (2006.01)
*B25D 11/10* (2006.01)
*B25D 17/08* (2006.01)

(52) U.S. Cl.
CPC ........ *B25D 17/08* (2013.01); *B25D 2250/121* (2013.01); *B25D 2250/231* (2013.01)

(58) Field of Classification Search
CPC .... B25D 16/006; B25D 17/005; B25D 17/08; B25D 2250/121; B25D 2250/231; E21B 6/06
See application file for complete search history.

(56) References Cited

U.S. PATENT DOCUMENTS 3,463,246 A * 8/1969 Helmut ................ B25D 17/088 173/110
3,650,336 A * 3/1972 Koehler ............... B25D 16/003 173/110

(Continued)

FOREIGN PATENT DOCUMENTS

EP 2314419 A1 4/2011
EP 2821183 A1 1/2015

(Continued)

OTHER PUBLICATIONS

International Search Report of PCT/EP2021/054419 dated May 3, 2021.

*Primary Examiner* — Thomas M Wittenschlaeger
*Assistant Examiner* — David G Shutty
(74) *Attorney, Agent, or Firm* — Davidson Kappel LLC

(57) ABSTRACT

A power tool, in particular a chipping hammer, containing a tool-fitting element for receiving and holding a tool, in particular a chisel, and an apparatus for selectively turning the tool-fitting element. The apparatus contains an impact-mechanism housing having a connecting device, a coupling element having an attachment device, and an uncoupling element for reversibly separating the coupling element from the impact-mechanism housing, wherein the coupling element is settable reversibly in a first or second position, and wherein, in the first position, the coupling element is connected releasably to the impact-mechanism housing such that the tool-fitting element is prevented from turning about an axis of rotation and, in the second position, the coupling element is movable relative to the impact-mechanism housing such that the tool-fitting element is able to be turned about an axis of rotation relative to the impact-mechanism housing.

11 Claims, 23 Drawing Sheets

(56) References Cited

U.S. PATENT DOCUMENTS

| | | | | | |
|---|---|---|---|---|---|
| 3,866,692 | A * | 2/1975 | Stelljes | B25D 16/006 173/133 |
| 5,111,890 | A * | 5/1992 | Ranger | B25D 17/06 173/104 |
| 5,211,693 | A * | 5/1993 | Pacher | B23B 31/113 408/239 R |
| 5,842,527 | A * | 12/1998 | Arakawa | B25D 16/006 173/104 |
| 6,609,577 | B2 * | 8/2003 | Beccu | B25B 19/00 173/104 |
| 6,938,705 | B2 * | 9/2005 | Kikuchi | B25D 11/005 173/210 |
| 7,121,359 | B2 * | 10/2006 | Frauhammer | B25D 16/006 173/104 |
| 7,331,496 | B2 * | 2/2008 | Britz | B25D 16/006 74/22 A |
| 7,497,272 | B2 * | 3/2009 | Strasser | B25D 16/006 173/4 |

FOREIGN PATENT DOCUMENTS

| | | | | |
|---|---|---|---|---|
| EP | 2871029 A1 | | 5/2015 | |
| EP | 2871029 B1 | * | 9/2023 | B25D 16/006 |
| FR | 2216050 A1 | | 8/1974 | |

* cited by examiner

APPARATUS FOR ADJUSTING A CHISEL

The present invention relates to a power tool, in particular a chipping hammer, containing a tool-fitting element for receiving and holding a tool, in particular a chisel, and an apparatus for selectively turning the tool-fitting element.

BACKGROUND

Hammer drills and/or chipping hammers of the type mentioned at the beginning are known in principle from the prior art.

SUMMARY OF THE INVENTION

As a result of sustained and unvaried use of a chisel in a chipping hammer for working on a mineral material, the abrasive action of the material can result in one-sided or irregular wear at the tip of the chisel.

In order to counteract such irregular wear of a chisel, the chisel has to be rotated about its longitudinal axis at regular intervals. To this end, the chisel has to be removed from the relevant tool fitting, rotated and reinserted into the tool fitting. However, chipping hammers are known from the prior art that already have an apparatus for rotating the tool fitting together with the chisel without the chisel having to be removed from the chipping hammer.

Previously known apparatuses on chipping hammers for rotating the tool fitting together with the chisel are usually complex, expensive and complicated to manipulate, however.

It is an object of the present invention to provide a power tool that contains an improved apparatus for selectively turning the tool-fitting element.

The present invention provides a power tool, in particular a chipping hammer, containing a tool-fitting element for receiving and holding a tool, in particular a chisel, and an apparatus for selectively turning the tool-fitting element.

According to the invention, the apparatus contains an impact-mechanism housing having a connecting device, a coupling element having an attachment device, and an uncoupling element for reversibly separating the coupling element from the impact-mechanism housing, wherein the coupling element is settable reversibly in a first or second position, and wherein, in the first position, the coupling element is connected releasably to the impact-mechanism housing such that the tool-fitting element is prevented from turning about an axis of rotation and, in the second position, the coupling element is movable relative to the impact-mechanism housing such that the tool-fitting element is able to be turned about an axis of rotation relative to the impact-mechanism housing.

According to one advantageous configuration of the present invention, it may be possible for the impact-mechanism housing to contain a connecting device and for the coupling element to contain an attachment device corresponding to the connecting device such that, as a result of the connecting device being reversibly connected to the attachment device, the coupling element is releasably connected to the impact-mechanism housing.

According to a further advantageous configuration of the present invention, it may be possible for both the connecting device and the corresponding attachment device to be configured in the form of a toothing. This results, in a simple manner, in a rotationally fixed form fit between the connecting device and the attachment device with a large number of setting or orientation options.

According to one advantageous configuration of the present invention, it may be possible for a threaded device to be contained between the uncoupling element and the coupling element such that, as a result of the uncoupling element being rotated about the axis of rotation, the coupling element is moved at least to such an extent in an axial direction that the connecting device and attachment device are separated from one another and the coupling element together with the tool-fitting element are able to be turned relative to the impact-mechanism housing.

According to a further advantageous configuration of the present invention, it may be possible for an actuating cap to be contained, which is configured such that, in a mounted state, at least one part of the impact-mechanism housing, the coupling element and the uncoupling element are able to be received inside the actuating cap, and as a result of the actuating cap being rotated about the axis of rotation, the uncoupling element is rotated about the axis of rotation.

According to one advantageous configuration of the present invention, it may be possible for the actuating cap to contain at least a holding sleeve and an unlocking sleeve, wherein the unlocking sleeve is able to be turned about the axis of rotation relative to the holding sleeve and the unlocking sleeve is connected to the uncoupling element for conjoint rotation such that, as a result of the unlocking sleeve being rotated about the axis of rotation, the uncoupling element is also rotated about the axis of rotation.

According to a further advantageous configuration of the present invention, it may be possible for the actuating cap to contain at least one ventilation duct through which an air flow for cooling the internal volume of the actuating cap can flow in an axial direction. As a result, virtually optimal cooling inside the actuating cap and of the constituents positioned inside the actuating cap can be achieved.

Further advantages will become apparent from the following description of the figures. Various exemplary embodiments of the present invention are illustrated in the figures. The figures, the description and the claims contain numerous features in combination. A person skilled in the art will expediently also consider the features individually and combine them to form useful further combinations.

BRIEF DESCRIPTION OF THE DRAWINGS

In the figures, identical and similar components are denoted by the same reference signs. In the figures.

DETAILED DESCRIPTION

Figure 1:
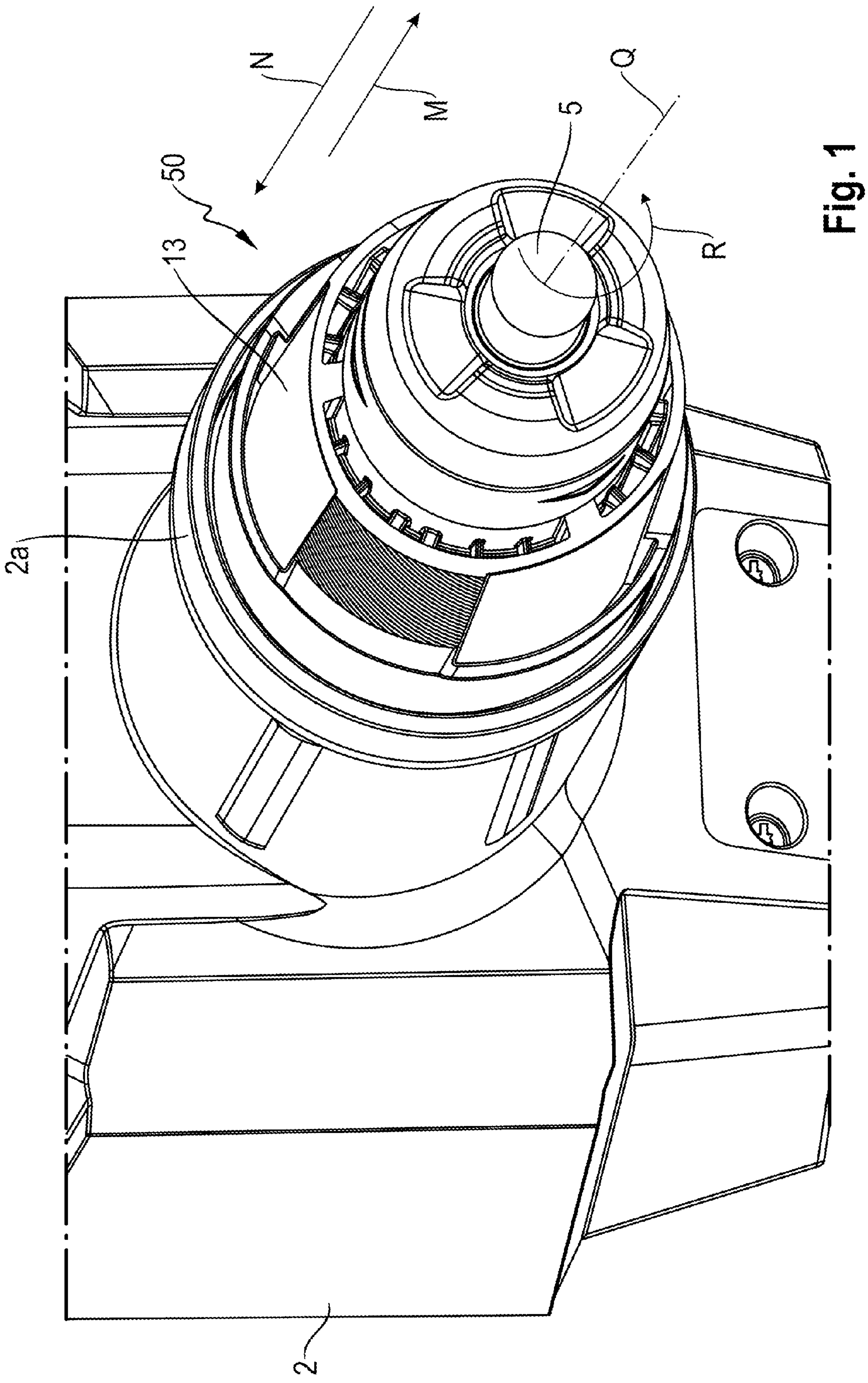
FIG. 1 shows a perspective view of a front end of a power tool having a tool-holding apparatus.
Figure 2:
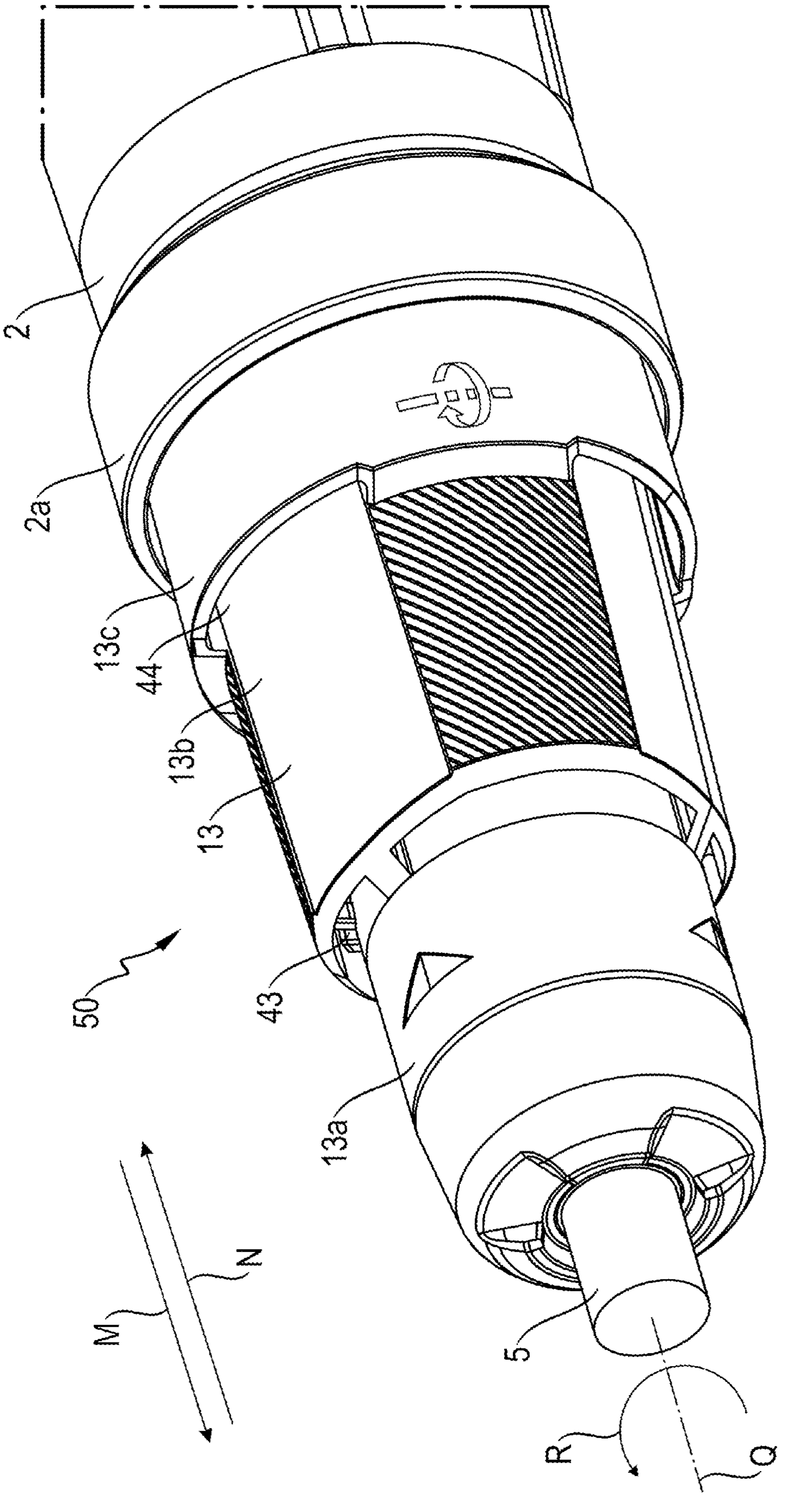
FIG. 2 shows a perspective view of the tool-holding apparatus.

FIG. 1 shows a front part of a power tool 1. The power tool is in this case configured in the form of a chipping hammer. However, it is also possible for the power tool 1 to be configured in the form of a combination hammer.

The power tool 1 configured as a chipping hammer contains primarily a power-tool housing 2, a tool-fitting device 50 and a handle. The power-tool housing 2 contains a front end 2*a* and a rear end. The figures show only a part of the power-tool housing 2 and the front end 2*a*. The handle is located at a rear end of the power-tool housing 2 and serves for holding and guiding the power tool 1.

Figure 18:
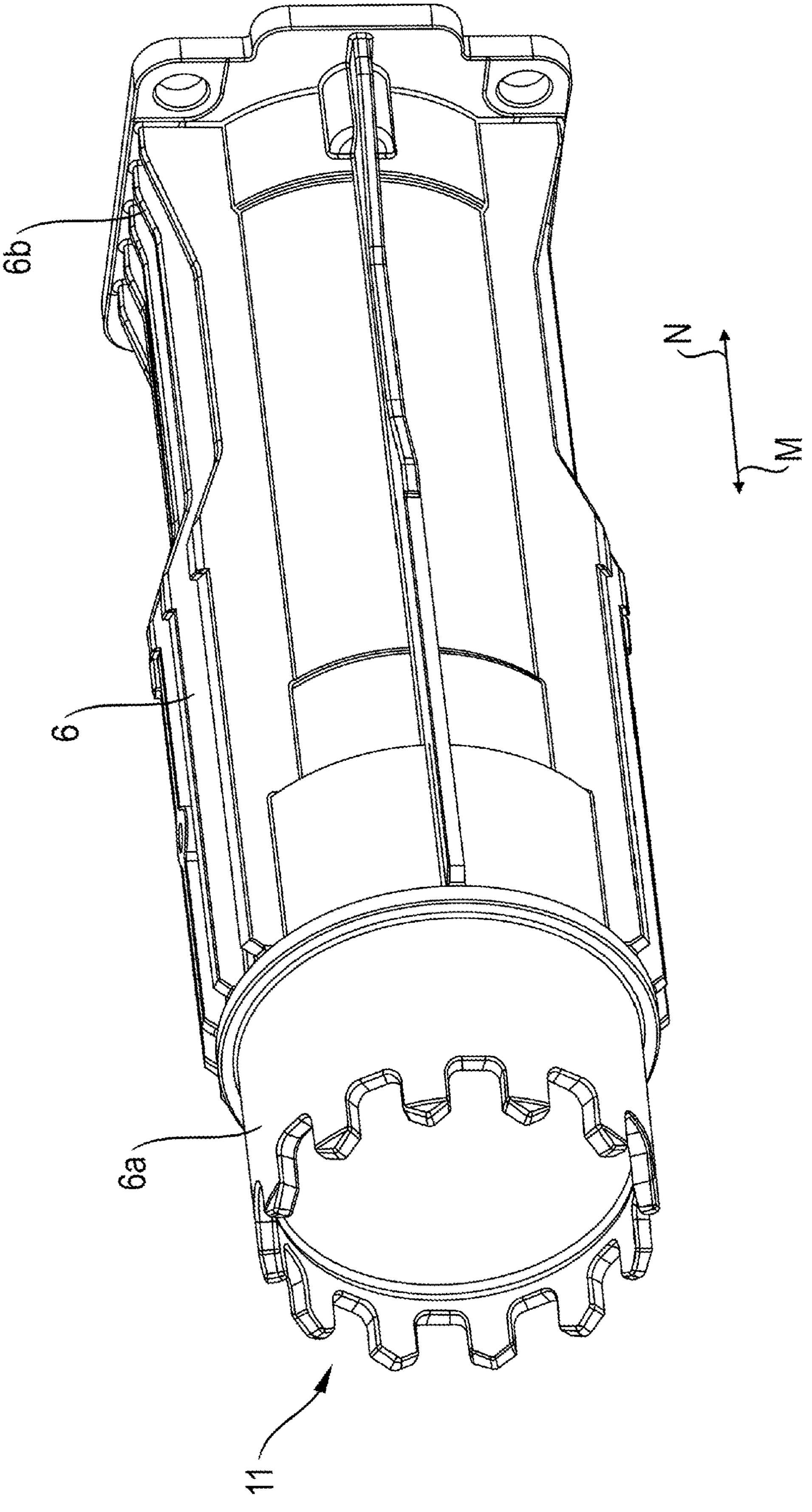
FIG. 18 shows a perspective view of an impact-mechanism housing having a connecting device.
Figure 20:
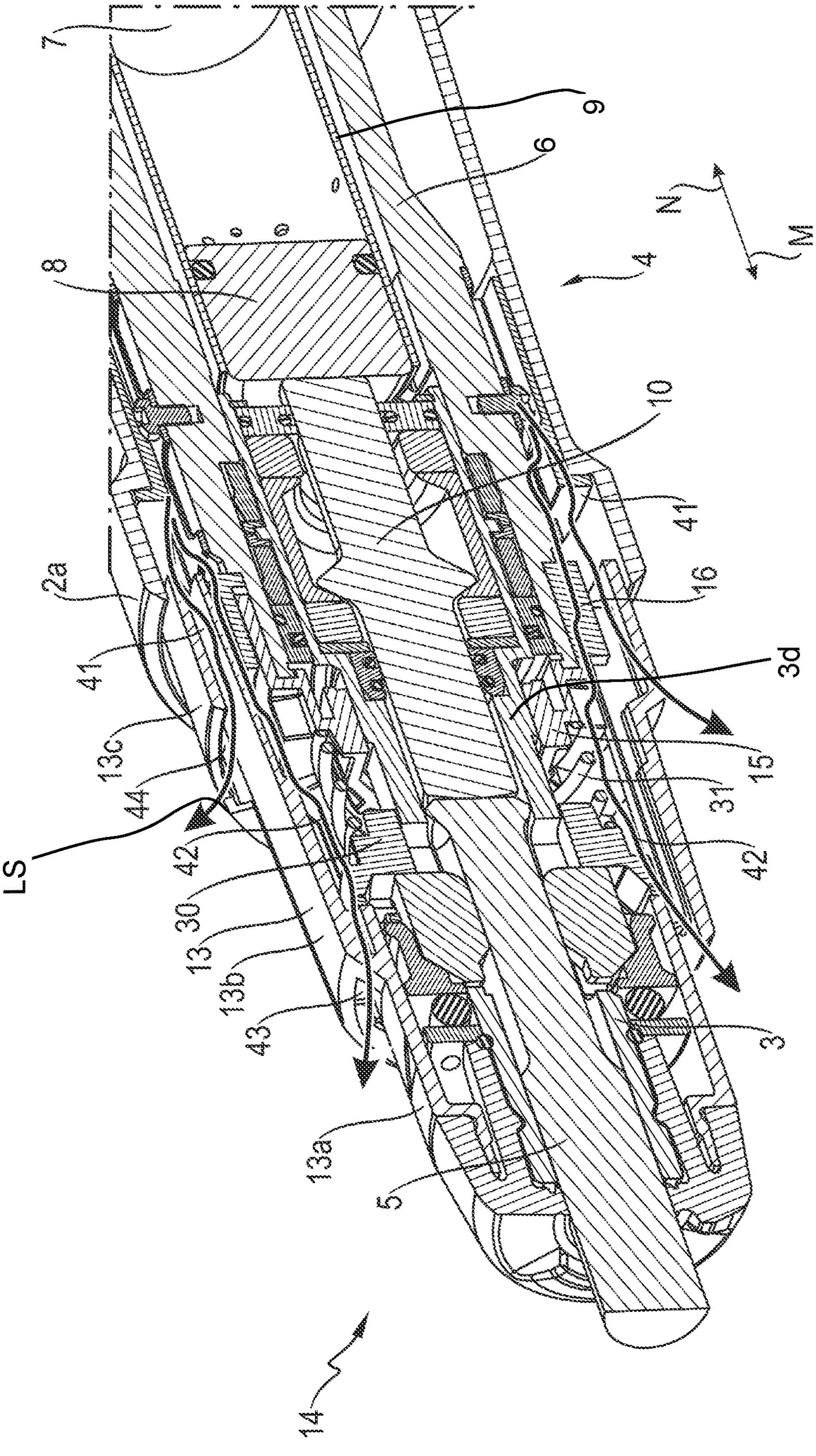
FIG. 20 shows a perspective sectional view of a tool-fitting device.

Furthermore, the power tool 1 contains an impact mechanism 4 for generating strikes on a tool 5 (i.e. chisel) positioned in the tool-fitting device 50 (cf. FIG. 20). The impact mechanism 4 contains, inter alia, an impact-mechanism housing 6 (cf. FIG. 18). The impact-mechanism housing 6 can also be referred to as a guide-tube housing and is configured substantially as an elongate hollow cylinder with a front end 6*a* and a rear end 6*b*. The front end 6*a* and rear end 6*b* can be referred to as constituents of the impact-mechanism housing 6. In particular, the front end 6*a* is a constituent of the impact-mechanism housing 6. The essential constituents of the impact mechanism 4 are arranged or positioned in the impact-mechanism housing 6. The essential constituents of the impact mechanism 4 include for example an exciter piston 7, an impact piston 8, a guide tube 9 and an anvil 10 (cf. FIGS. 20 and 23). As is apparent from FIG. 18, a connecting device 11 in the form of a toothing is provided at the front end 6*a* of the impact-mechanism housing 6. As a result of the configuration, the connecting device 11 can also be referred to as a crown. The individual teeth of the connecting device 11 configured as a toothing extend in the axial direction M.

As described in more detail below, the impact-mechanism housing 6 is positioned in the power tool 1 such that the front end 6*a* of the impact-mechanism housing 6, or the connecting device 11 at the front end 6*a* of the impact-mechanism housing 6, is located in the tool-fitting device 50, cf. FIG. 23.

The tool-fitting device 50 is positioned at a front end 2*a* of the power-tool housing 2 and in turn contains primarily a tool-fitting element 3, an actuating cap 13 and an apparatus 14 for selectively turning the tool-fitting element 3 (cf. FIG. 20).

The apparatus 14 for selectively turning the tool-fitting element 3 in turn contains primarily a coupling element 15, an uncoupling element 16 and a spring element 31.

The coupling element 15 is shown in FIGS. 4 to 9 and is configured substantially as a cylindrical sleeve or as a hollow cylinder. The coupling element 15 can also be referred to as a coupling collar and contains a front end 15*a* and a rear end 15*b*. Contained at the front end 15*a* of the coupling element 15 is a rotation-prevention means 19. The rotation-prevention means 19 in turn contains a number of axially oriented recesses 15*c*, cf. FIG. 4. The recesses 15*c* are in this case positioned at regular spacings around the outer lateral face of the front end 15*a* of the coupling element 15. The rotation-prevention means 19 having the recesses 15*c* serves for connection to the actuating cap 13 for conjoint rotation. The actuating cap 13 contains, on an inner lateral face, a multiplicity of elongate elevations 20, which are arranged at regular spacings and extend in the axial direction M, N.

Figure 17:
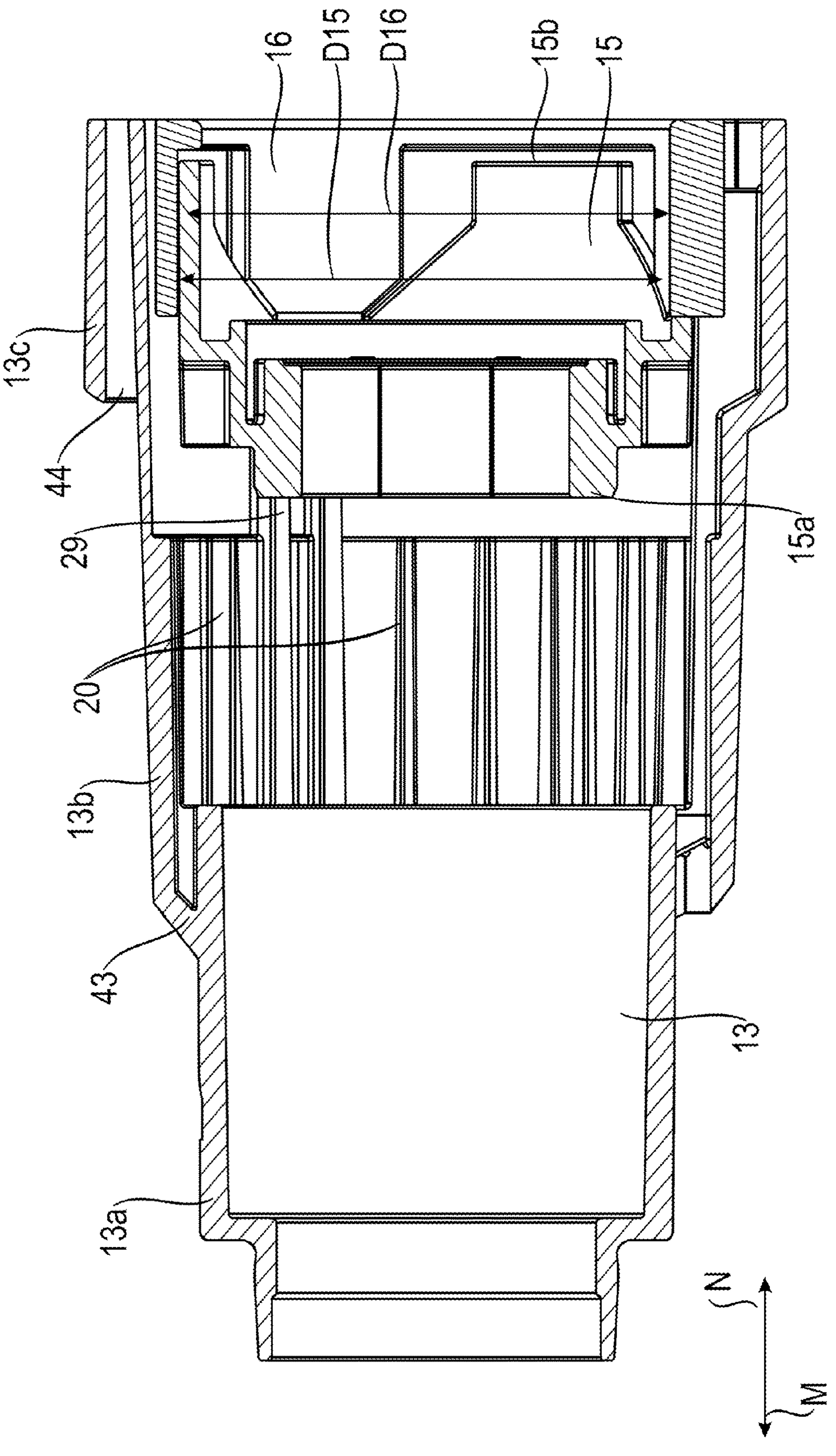
FIG. 17 shows a lateral sectional view of the coupling element in conjunction with the uncoupling element inside an actuating cap.

A connection between the coupling element 15 and the actuating cap 13 for conjoint rotation is achieved by a form fit when the elongate elevations 20 on the actuating cap 13 engage in the elongate recesses 15*c* in the coupling element 15, cf. FIG. 17. As a result of the recesses 15*c* being configured in the form of axially extending slots or grooves, the coupling element 15 can be moved in the axial direction M, N relative to the actuating cap 13 when the coupling element 15 and the actuating cap 13 are connected together.

Figure 8:
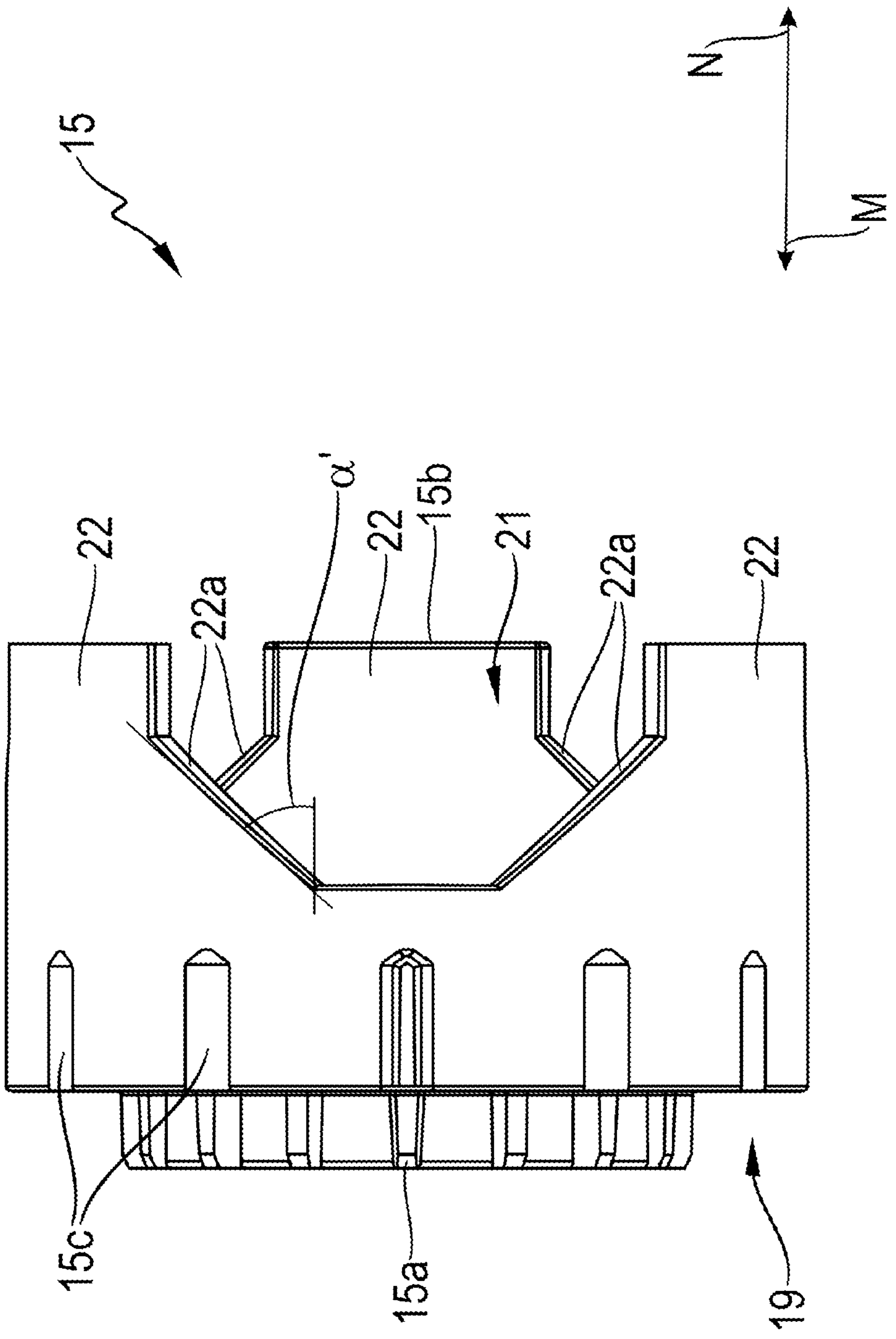
FIG. 8 shows a side view of the coupling element.

At the rear end 15*b* of the coupling element 15, the lateral face has three cutouts 21 distributed regularly around the circumference of the coupling element 15, resulting accordingly in three elevations 22 distributed regularly around the circumference of the coupling element 15 (cf. FIG. 8). As is apparent in particular from FIG. 8, the elevations 22 are configured substantially in a wedge-shaped manner. In other words, the side faces 22*a* of each elevation 22 extend obliquely in the axial direction. The side faces 22*a*, extending obliquely in the axial direction, of the elevations 22 can also be referred to as shoulders of the elevation 22.

Figure 5:
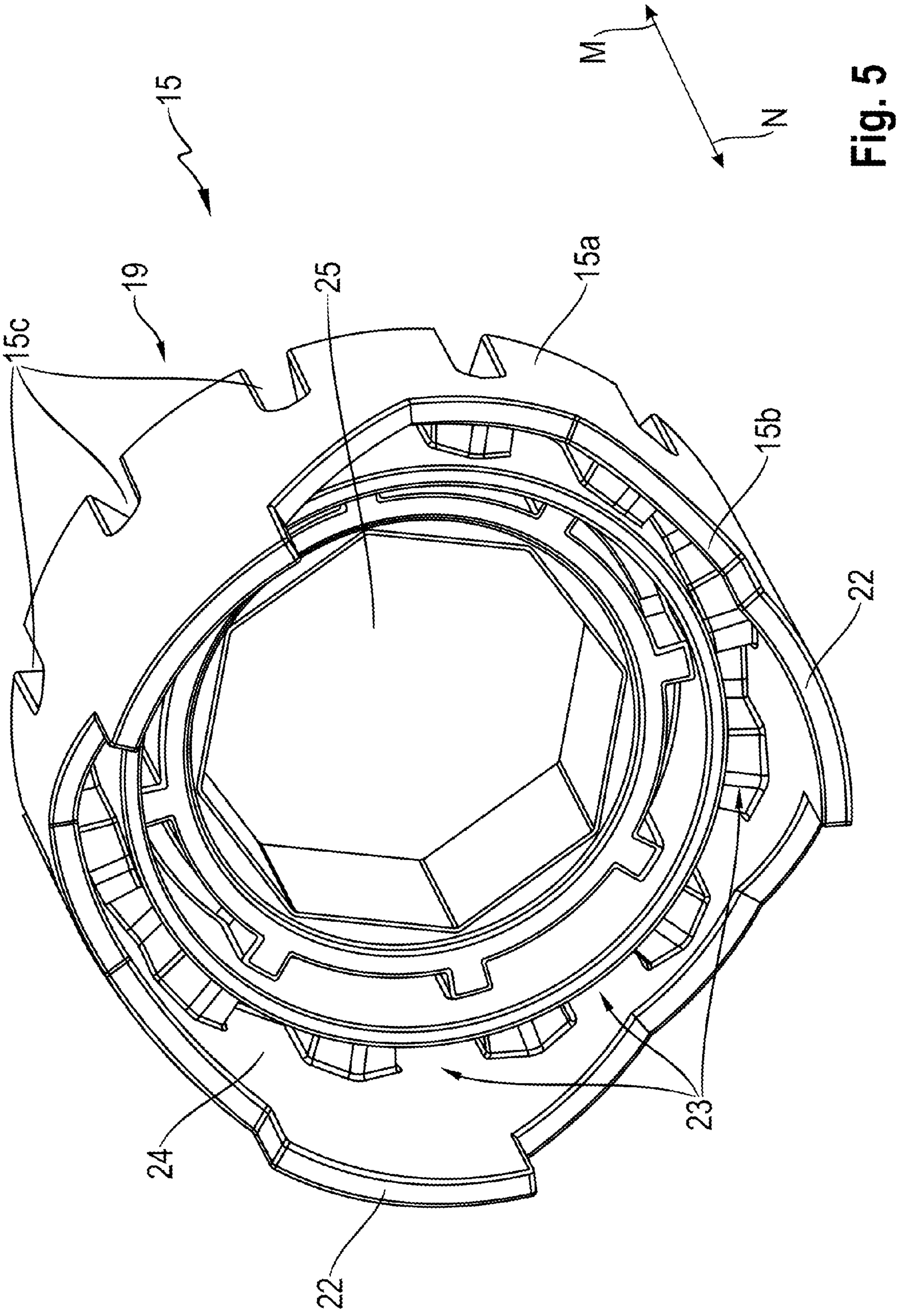
FIG. 5 shows a perspective rear view of the coupling element.
Figure 6:
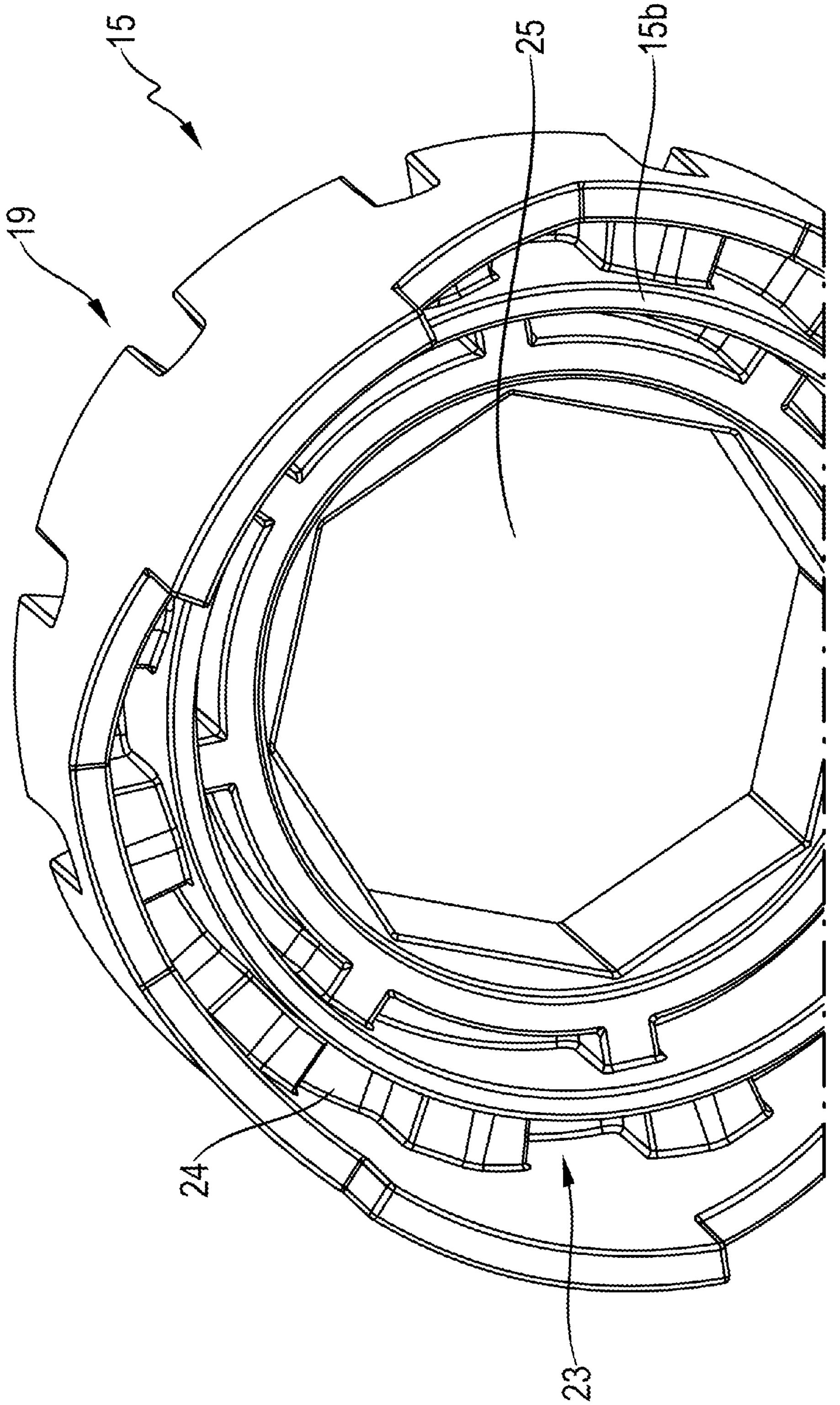
FIG. 6 shows a further perspective rear view of the coupling element with a detail view of the attachment device.
Figure 7:
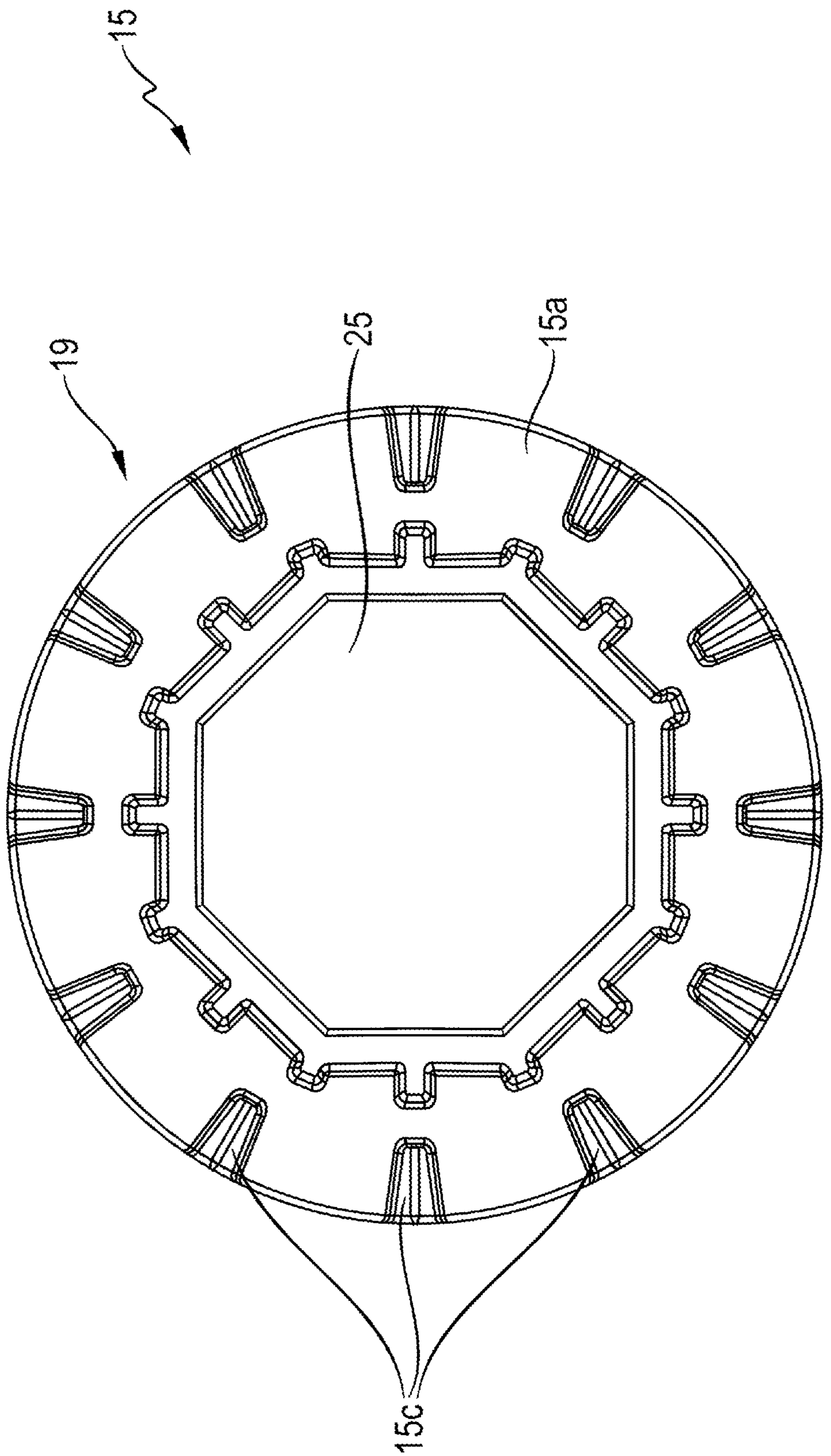
FIG. 7 shows a front view of the coupling element.
Figure 9:
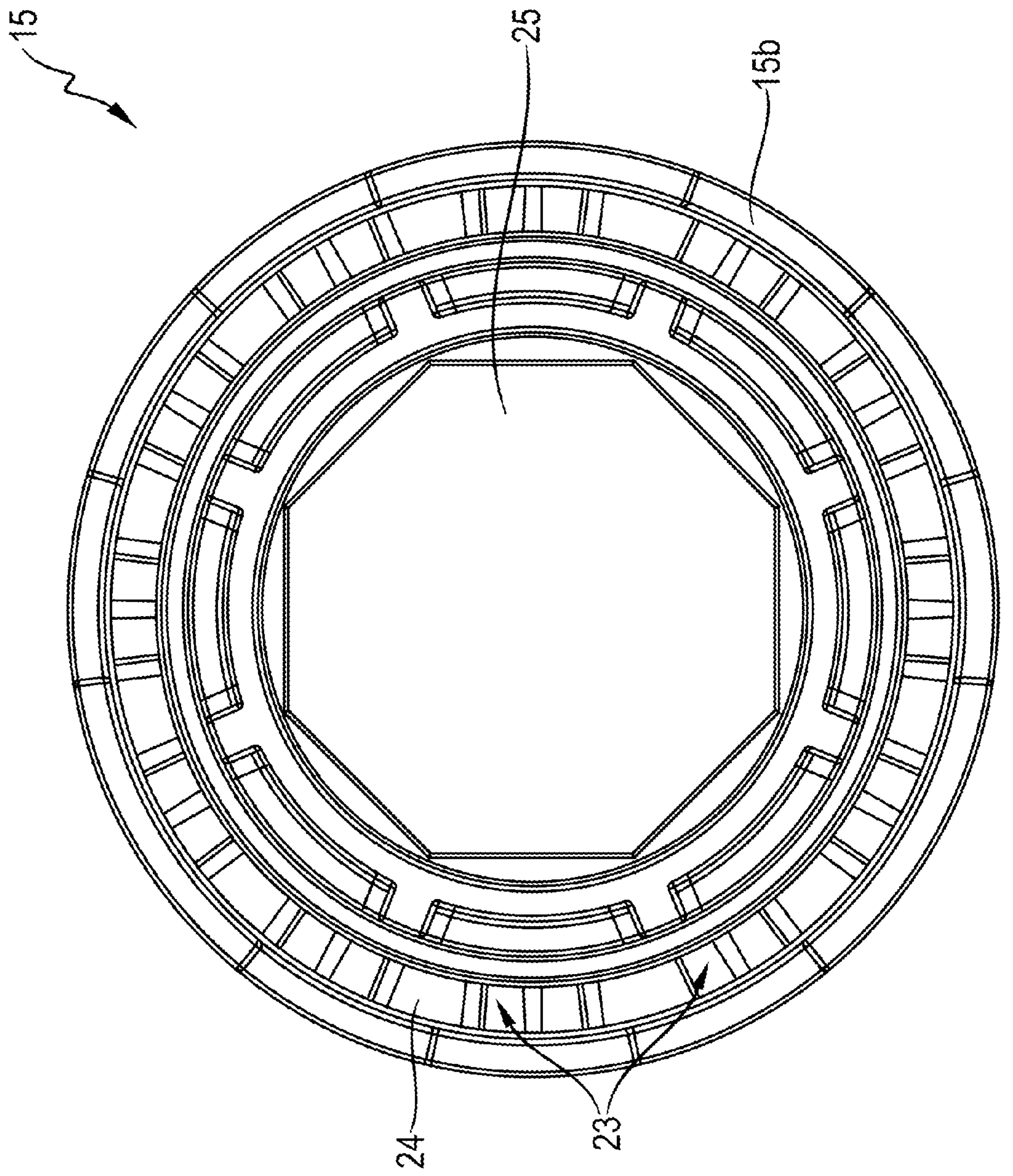
FIG. 9 shows a rear view of the coupling element.
Figure 10:
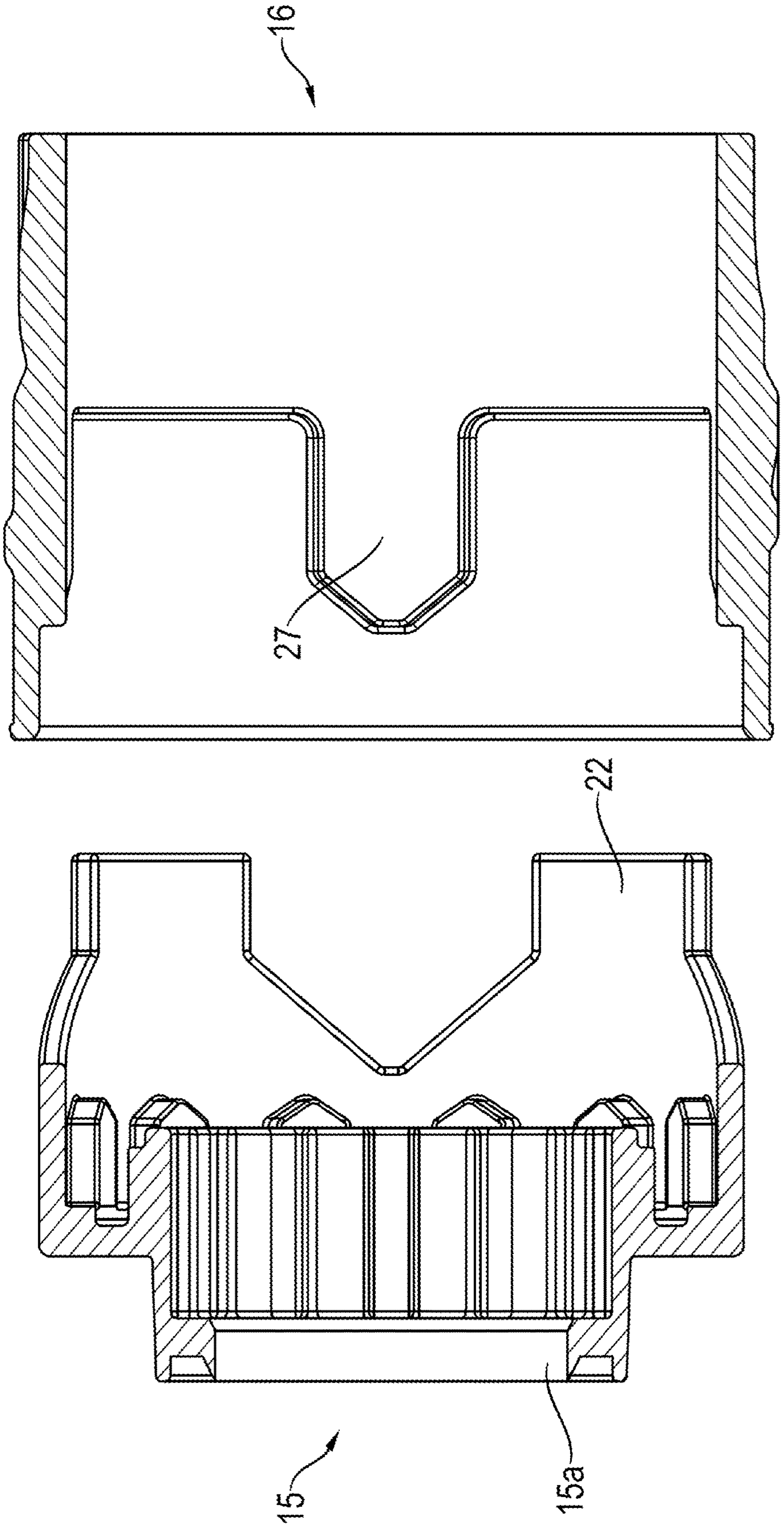
FIG. 10 shows a lateral sectional view of the coupling element and the uncoupling element in a separated state.
Figure 11:
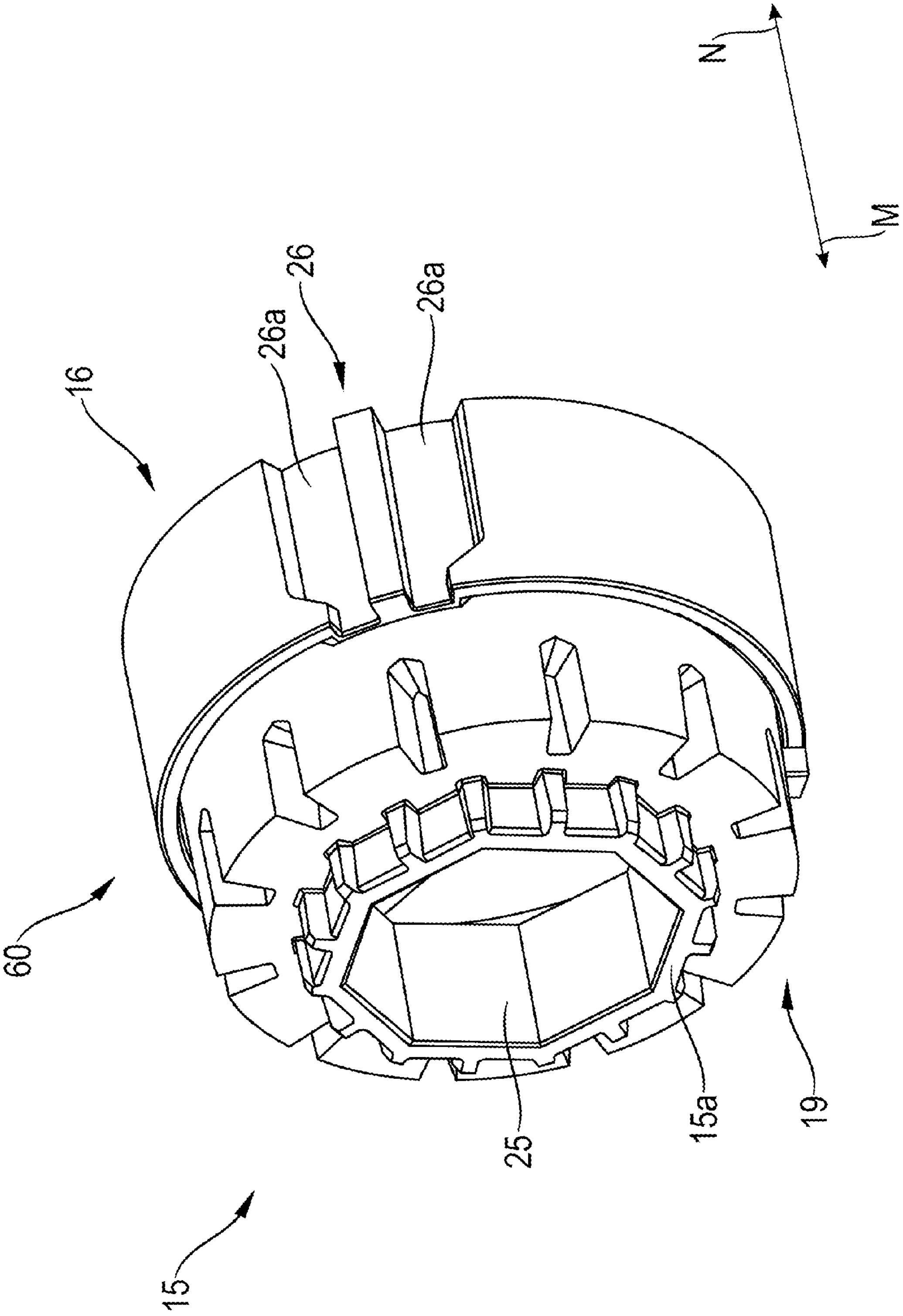
FIG. 11 shows a perspective front view of the coupling element in conjunction with the uncoupling element.

Furthermore, as is apparent from FIGS. 5, 6 and 9, the coupling element 15 contains an attachment device 23. The attachment device 23 is configured in this case as a toothing and positioned in the inner peripheral region 24 of the coupling element 15 configured as a cylindrical sleeve. The toothing is oriented such that the individual teeth of the toothing extend in the axial direction N.

Furthermore, the coupling element 15 contains a central cutout 25, which can also be referred to as a through-hole. As is described in more detail below, in an assembled or mounted state, the tool-fitting element 3 is introduced into the coupling element 15. The central cutout 25 of the coupling element 15 is in this case configured such that a rotationally secure connection between the coupling element 15 and the tool-fitting element 3 introduced into the central cutout 25 of the coupling element 15 is created. However, in the assembled or mounted state with the tool-fitting element 3, the coupling element 15 can be moved in the axial direction relative to the tool-fitting element 3. In the present exemplary embodiment, the central cutout 25 of the coupling element 15 is configured in an octagonal manner. However, it is also possible for the central cutout 25 of the coupling element 15 to have some other polygonal shape. On choosing the shape of the central cutout 25 of the coupling element 25, care should be taken to ensure that, in an assembled or mounted state, a connection for conjoint rotation, but allowing axial movement, between the coupling element 15 and the tool-fitting element 3 is ensured.

Figure 3:
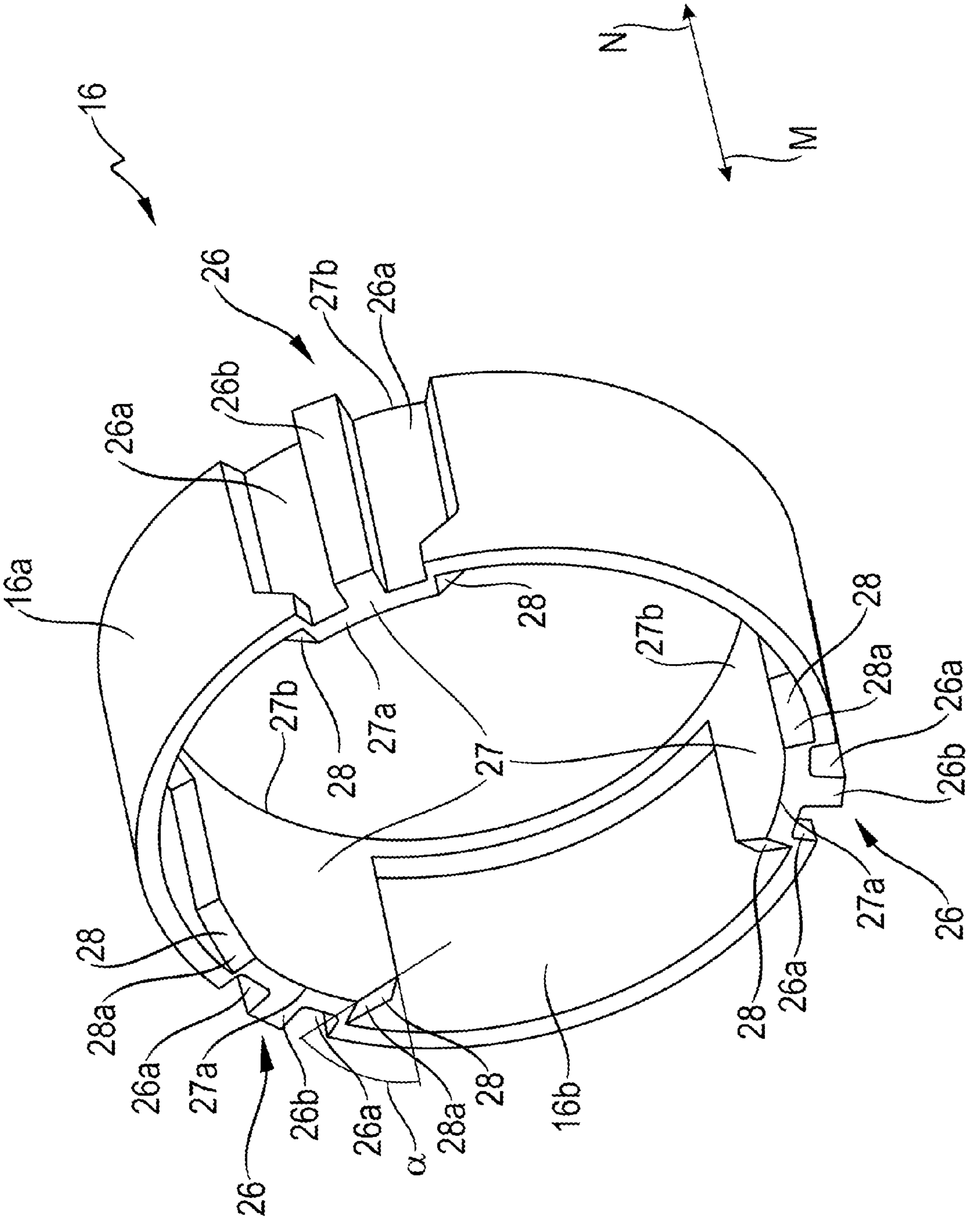
FIG. 3 shows a perspective view of an uncoupling element.
Figure 4:
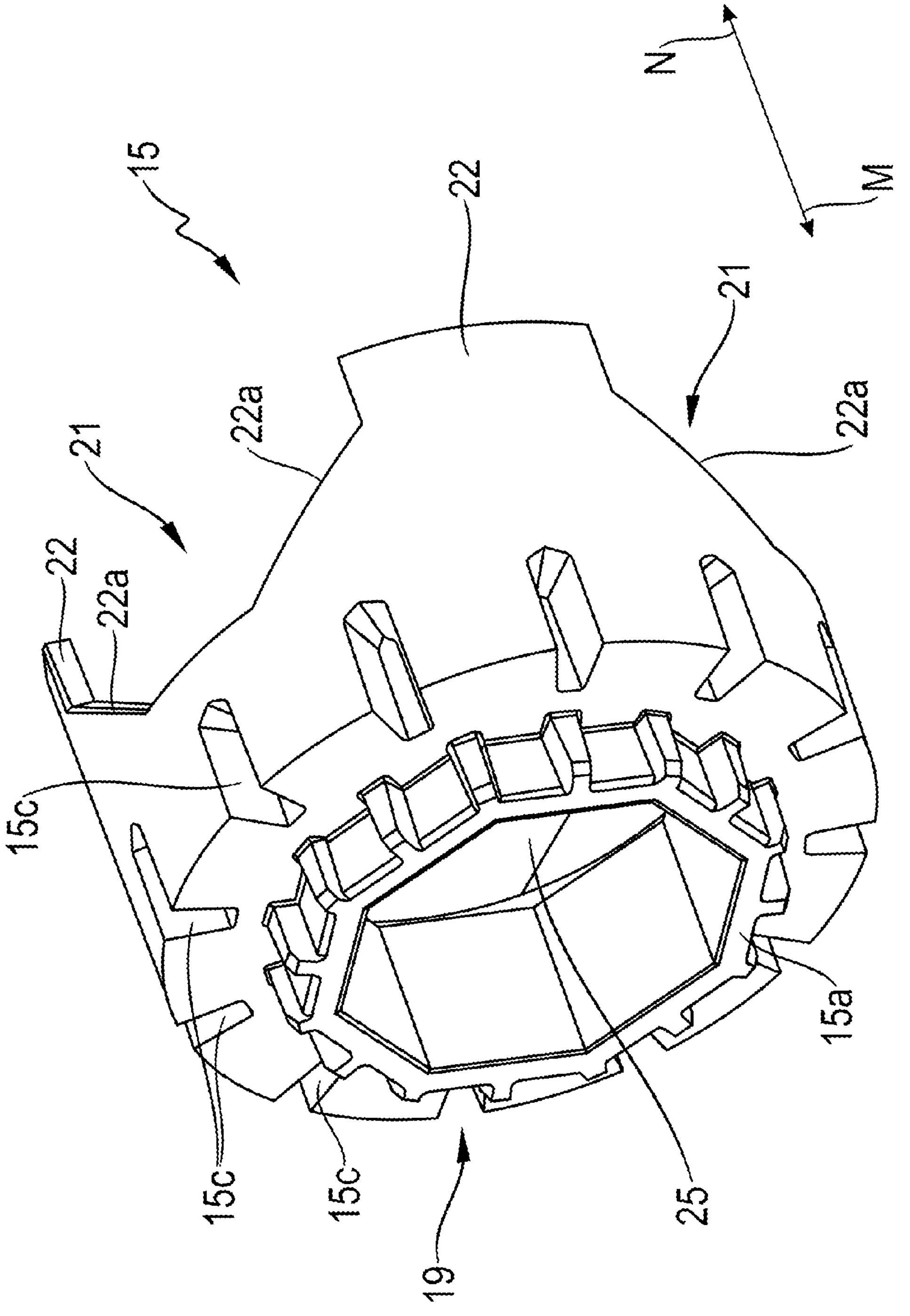
FIG. 4 shows a perspective front view of a coupling element.

The uncoupling element 16 is shown, inter alia, in FIG. 3 and is configured substantially as a cylindrical sleeve or ring.

On an outer lateral face 16*a* of the uncoupling element 16, three guides 26 are contained at regular spacings (i.e. with a 120° offset with respect to one another). Each guide 26 contains in this case two recesses 26*a* extending in parallel in the axial direction M and a rib 26*b* formed therebetween. The guides 26 serve to connect the uncoupling element 16 to the actuating cap 13 for conjoint rotation.

On an inner lateral face 16*b* of the uncoupling element 16, three elevations 27 are positioned at regular spacings (i.e. with a 120° offset with respect to one another). Each of these elevations 27 is configured substantially as a wide rib with a front and a rear end 27*a*, 27*b*. Provided opposite one another at the front end 27*a* of the elevation 27 are two chamfers 28, such that the elevation 27 narrows in the direction M. Each chamfer 26 has a contact face 28*a*. The chamfers 28 and also the contact faces 28*a* are substantially identical on each elevation 27.

Figure 12:
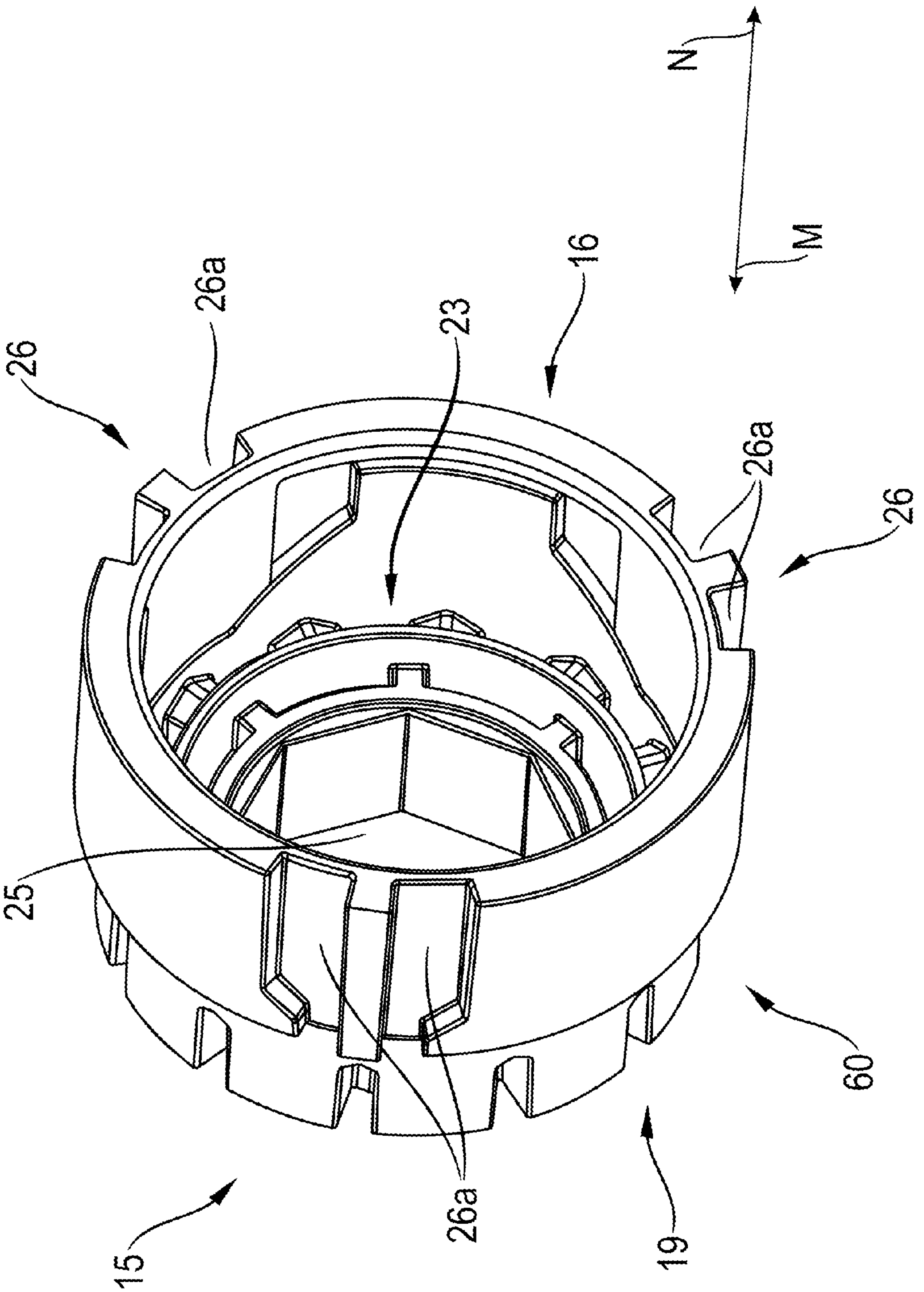
FIG. 12 shows a perspective rear view of the coupling element in conjunction with the uncoupling element.

The configuration of each chamfer 28 of the inner elevation 27 on the uncoupling element 16 should be chosen in this case such that the angle α of the chamfer 28 corresponds to the angle α' of the side faces 22*a* (shoulders) of each elevation 22 of the coupling element 15. As described in more detail below, in an assembled state of the coupling element 15 with the uncoupling element 16, the contact faces 28*a* of the chamfers 28 of the elevation 27 of the uncoupling element 16 bear against the side faces 22*a* (shoulders) of the elevations 22 of the coupling element 15 such that it is possible for the contact face 28*a* of the chamfer 28 of the uncoupling element 16 to slide in a planar manner along the side faces 22*a* (shoulders) of each elevation 22 of the coupling element 15 when the uncoupling element 16 is moved relative to the coupling element 15, or the uncoupling element 16 can guide the coupling element 15 and displace it in the axial direction M, cf. FIGS. 12 and 13.

The coupling element 15 together with the uncoupling element 16 form a threaded device 60, since, as a result of the coupling element 15 being turned relative to the uncoupling element 16, a linear stroke or a linear movement in the direction M is created.

Figure 13:
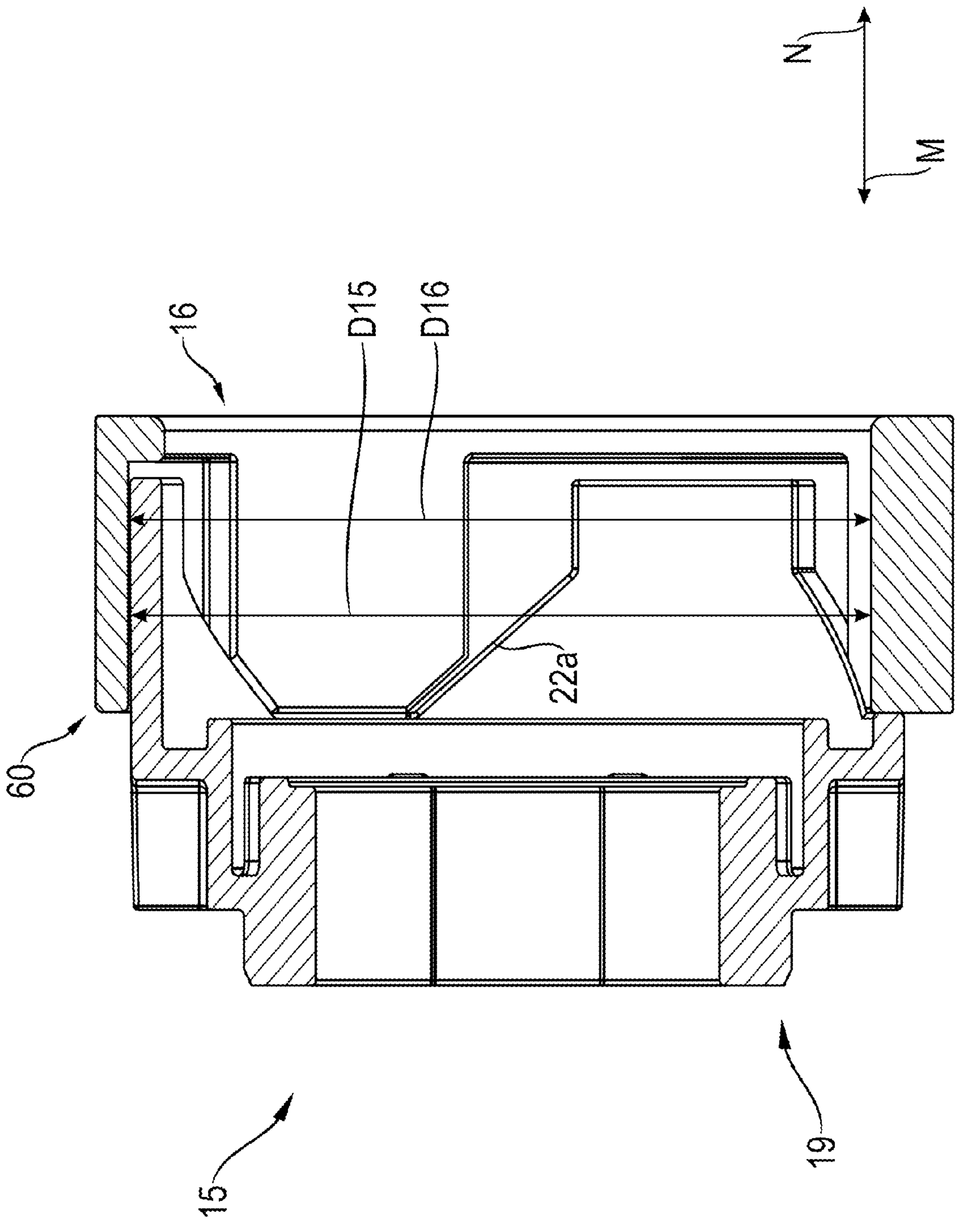
FIG. 13 shows a lateral sectional view of the coupling element in conjunction with the uncoupling element.

The inside diameter D16 of the uncoupling element 16 is somewhat greater than the outside diameter D15 of the coupling element 15 such that, in an assembled state, the coupling element 15 can be introduced into the internal volume of the uncoupling element 16, cf. FIGS. 13 and 17.

The actuating cap 13 is shown in particular in FIGS. 1, 2 and 14 to 17 and serves primarily to cover the tool-fitting device 50 and to actuate the uncoupling element 16. The actuating cap 13 contains primarily a first, second and third cylindrical portion 13*a*, 13*b*, 13*c*. As is apparent from the figures, e.g. FIG. 17, the three cylindrical portions 13*a*, 13*b*, 13*c* have different diameters and are arranged in a tiered manner such that the actuating cap 13 narrows in the axial direction M.

According to a first embodiment, the actuating cap 13 is configured in one piece, cf. FIGS. 14 to 17. However, it is also possible, according to an alternative embodiment, for the actuating cap 13 to be configured in more than one piece. Thus, it may be possible for the first, second and third portion 13*a*, 13*b*, 13*c* to be connected releasably to one another.

According to a further embodiment, it may be possible for the actuating cap 13 to contain at least a holding sleeve and an unlocking sleeve. The holding sleeve corresponds in this case substantially to the first and second cylindrical portion 13*a*, 13*b* according to the first embodiment of the actuating cap 13, wherein the first and second portion 13*a*, 13*b* are connected together. The unlocking sleeve corresponds in this case substantially to the third cylindrical portion 13*c* according to the first embodiment of the actuating cap 13. The unlocking sleeve is able to be turned in the direction of rotation R about the axis of rotation Q relative to the holding sleeve. The unlocking sleeve is in turn connected to the uncoupling element 16 for conjoint rotation such that, as a result of the unlocking sleeve being rotated about the axis of rotation Q, the uncoupling element 16 is also rotated about the axis of rotation Q.

As is apparent in particular from FIG. 17, the second cylindrical portion 13*b* of the actuating cap 13 has, on an inner lateral face, a multiplicity of elongate elevations 20, which are arranged at regular spacings and extend in the axial direction M, N. These elongate elevations 20 are configured such that they correspond to the recesses 15*c* at the front end 15*a* of the coupling element 15 in order that, in a mounted state, a connection for conjoint rotation but allowing axial displacement between the actuating cap 13 and the coupling element 15 can be created.

Figure 14:
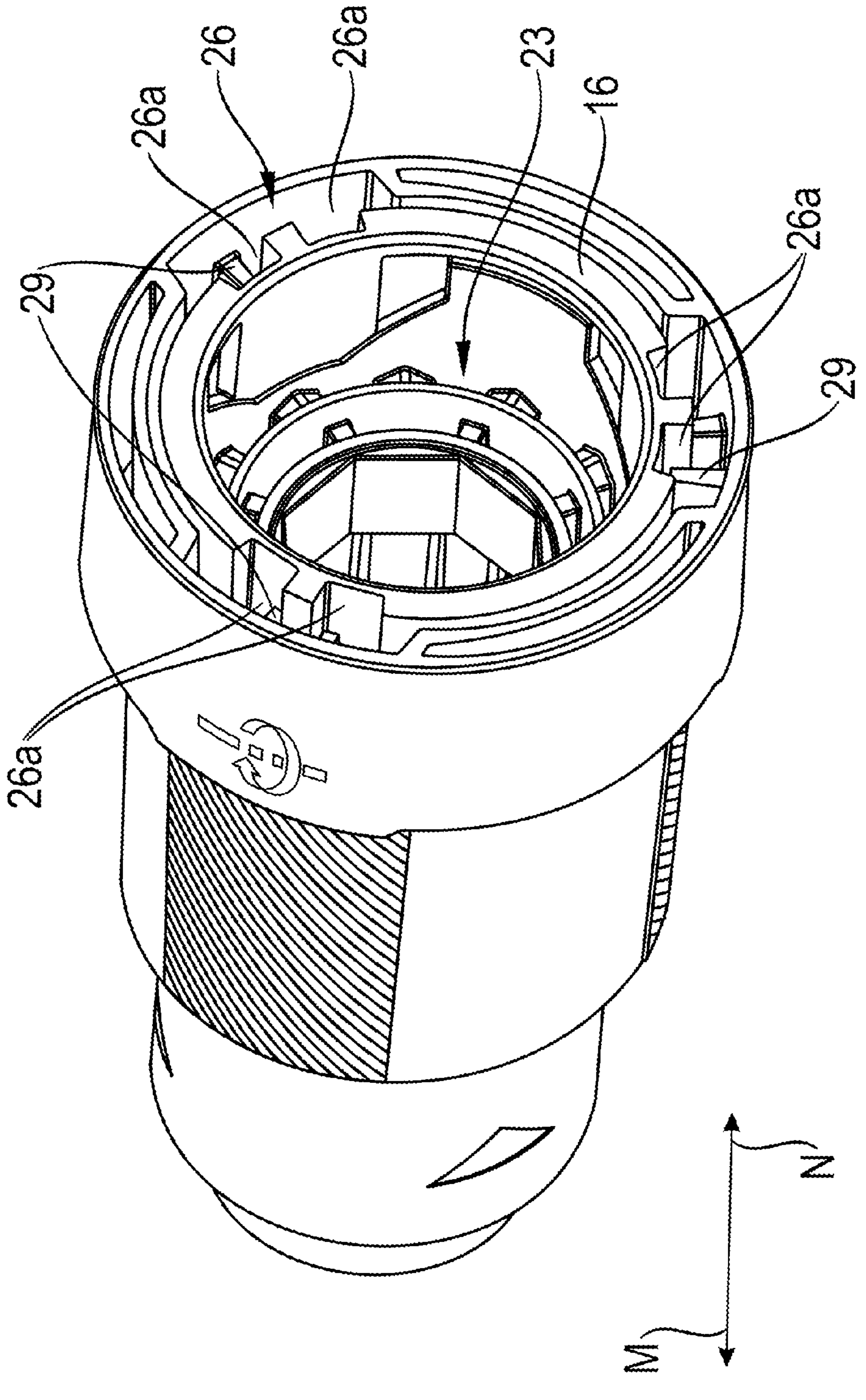
FIG. 14 shows a perspective rear view of the coupling element in conjunction with the uncoupling element inside an actuating cap.
Figure 15:
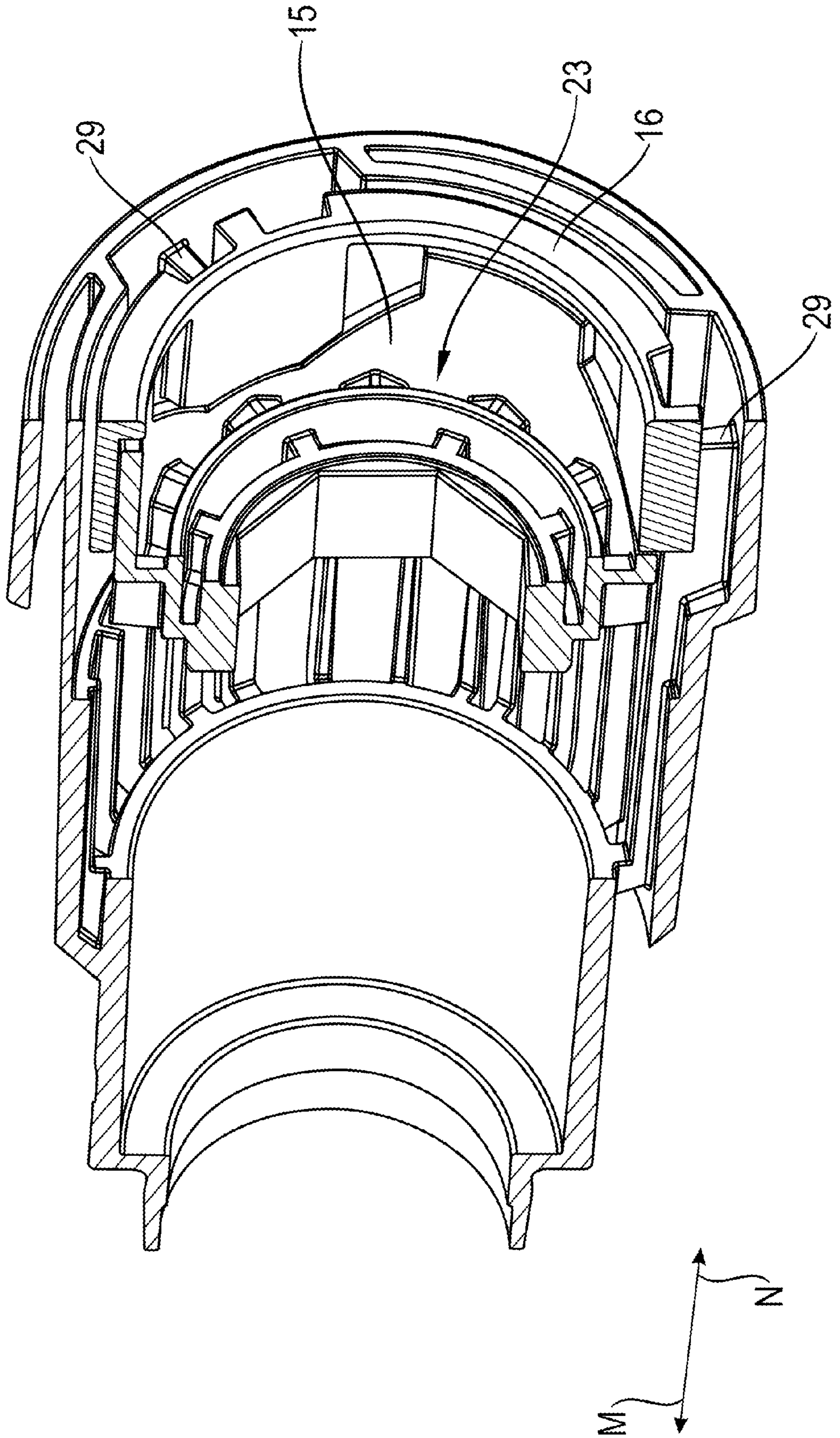
FIG. 15 shows a perspective sectional view of the coupling element in conjunction with the uncoupling element inside an actuating cap.
Figure 16:
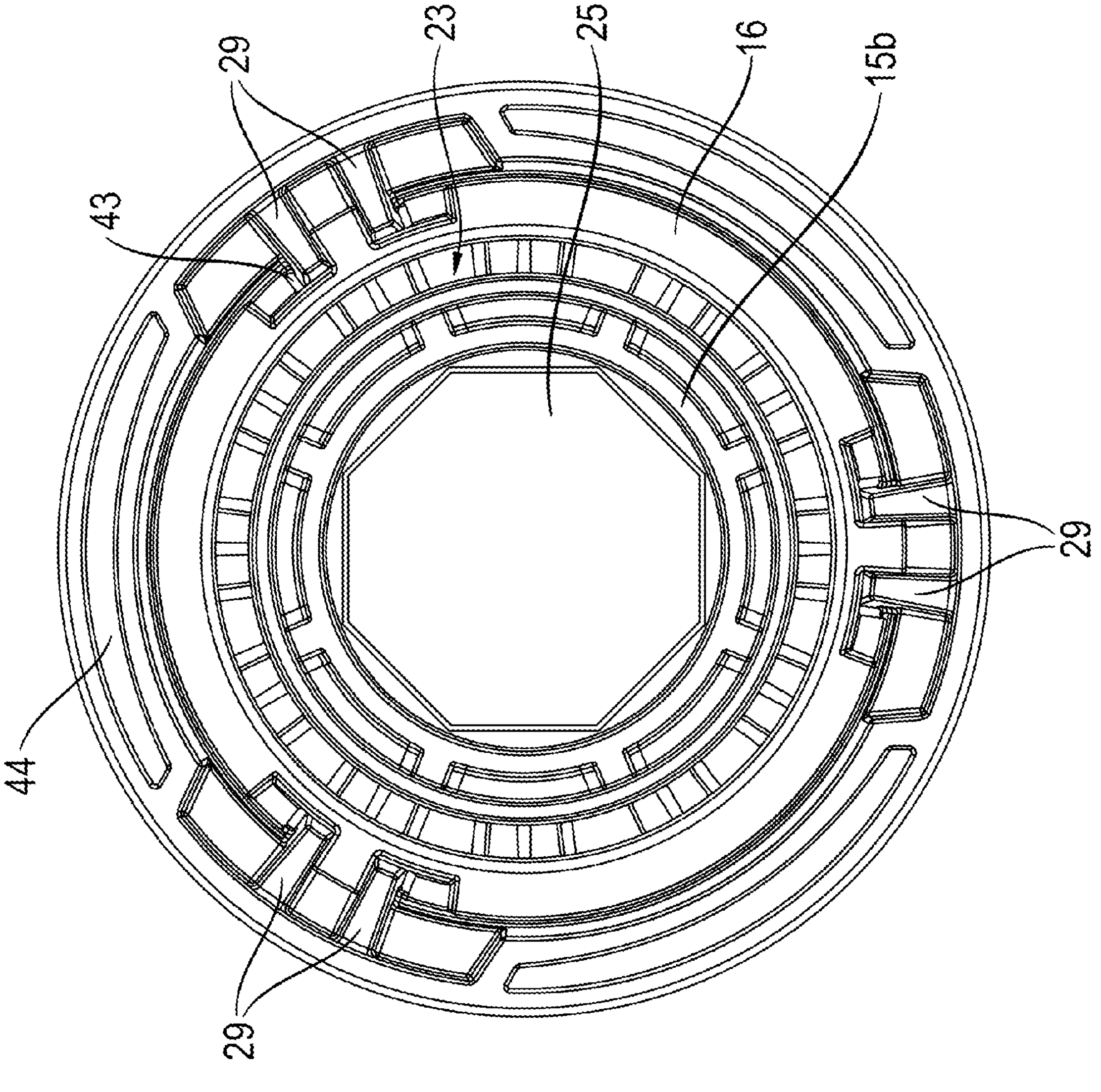
FIG. 16 shows a rear view of the coupling element in conjunction with the uncoupling element inside an actuating cap.

As is apparent from FIGS. 14, 15 and 16, the third cylindrical portion of the actuating cap 13 has, on an inner lateral face, three pairs of longitudinal ribs 29 that are regularly distributed (i.e. have a 120° offset with respect to one another). Only two longitudinal ribs are shown in FIG. 15. The pairs of longitudinal ribs 29 on the third portion 13*c* are provided to create a connection for conjoint rotation between the actuating cap 13 and the uncoupling element 16. In this case, the three pairs of longitudinal ribs 29 of the third portion 13*c* of the actuating cap 13 are configured such that they can be introduced into the recesses 26*a* in the outer lateral face 16*a* of the uncoupling element 16. The inside diameter of the third cylindrical portion 13*c* of the actuating cap 13 is in this case somewhat greater than the outside diameter of the uncoupling element 16 such that the uncoupling element 16 can be received in the internal volume of the third portion 13*c* of the actuating cap 13.

Figure 19:
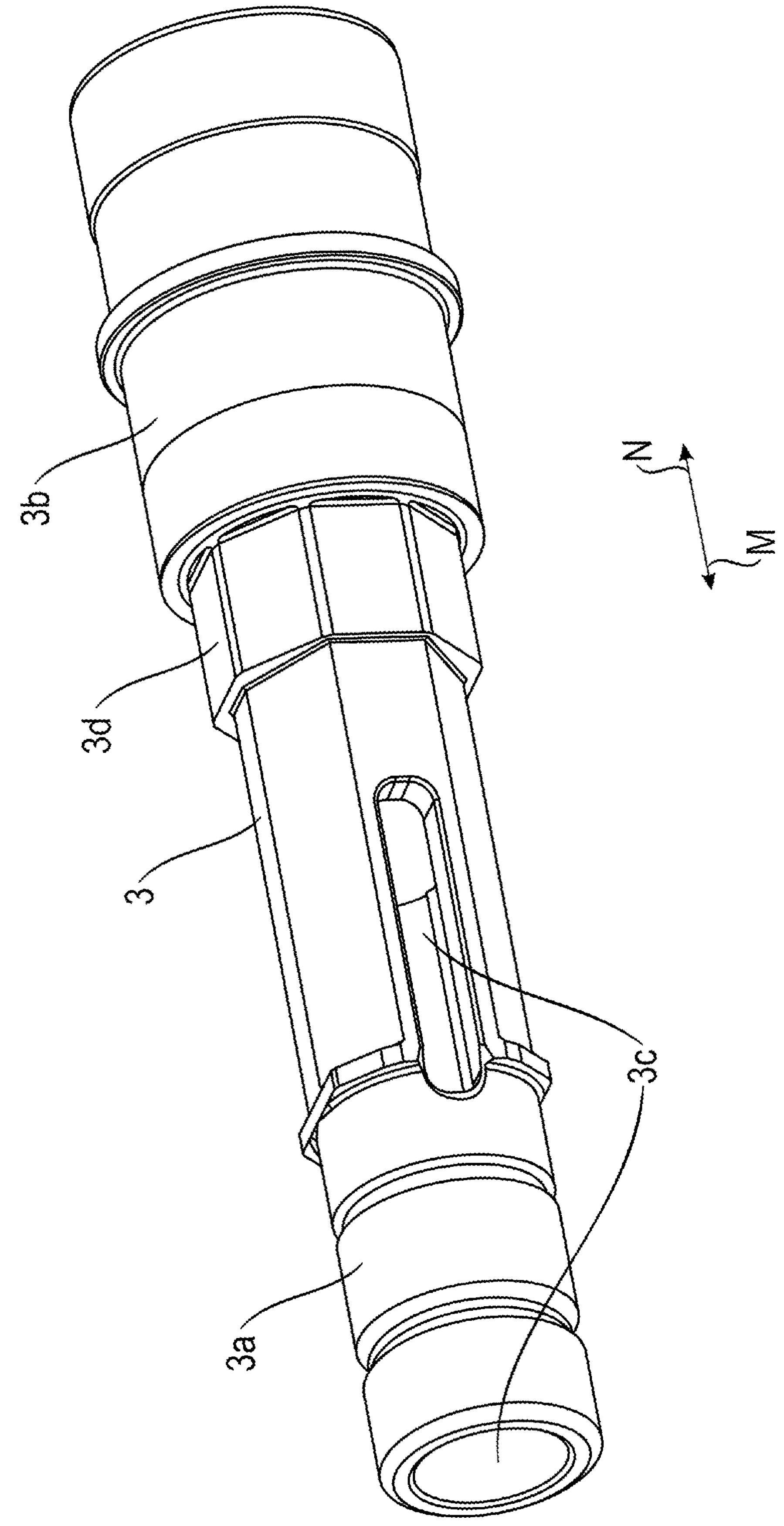
FIG. 19 shows a perspective view of a tool-fitting element.

The tool-fitting element 3 illustrated in FIG. 19 is configured substantially as an elongate sleeve having a first and a second portion 3*a*, 3*b*. The first portion 3*a* has in this case an outside diameter that is somewhat smaller than the outside diameter of the second portion 3*b*. Furthermore, the first portion 3*a* contains an internal volume 3*c* for receiving a tool 5 configured as a chisel. Moreover, an octagonal region 3*d* is provided at a rear end of the first portion 3*a*. The configuration of the octagonal region 3*d* of the first portion 3*a* of the tool-fitting element 3 corresponds to the configuration of the central cutout 25 in the coupling element 15. When, as shown in FIGS. 20 and 23, the tool-fitting element 3 has been introduced into the coupling element 15, there is a connection for conjoint rotation between the tool-fitting element 3 and the coupling element 15. A relative movement between the tool-fitting element 3 and the coupling element 15 in the axial direction M, N is possible, however. However, care should be taken to ensure that there is always a connection for conjoint rotation between the tool-fitting element 3 and the coupling element 15, even when the tool-fitting element 3 and the coupling element 15 are displaced with respect to one another in the axial direction M, N.

In order to mount the tool-fitting apparatus 50 or the apparatus for selectively turning the tool-fitting element 3, first of all the coupling element 15 is positioned in the uncoupling element 16 such that the contact face 28*a* of each chamfer 28 of the elevation 27 of the uncoupling element 16 bears against the respective contact face 22*a* of the shoulders of the elevation 22 of the coupling element 15, cf. FIGS. 3, 12, 13, 14, 15 and 17. As a result of the contact faces 28*a* of the chamfers 28 bearing against the contact faces 22*a* of the elevation 22, a force can be transmitted in the axial direction M from the uncoupling element 16 to the coupling element 15.

Figure 22:
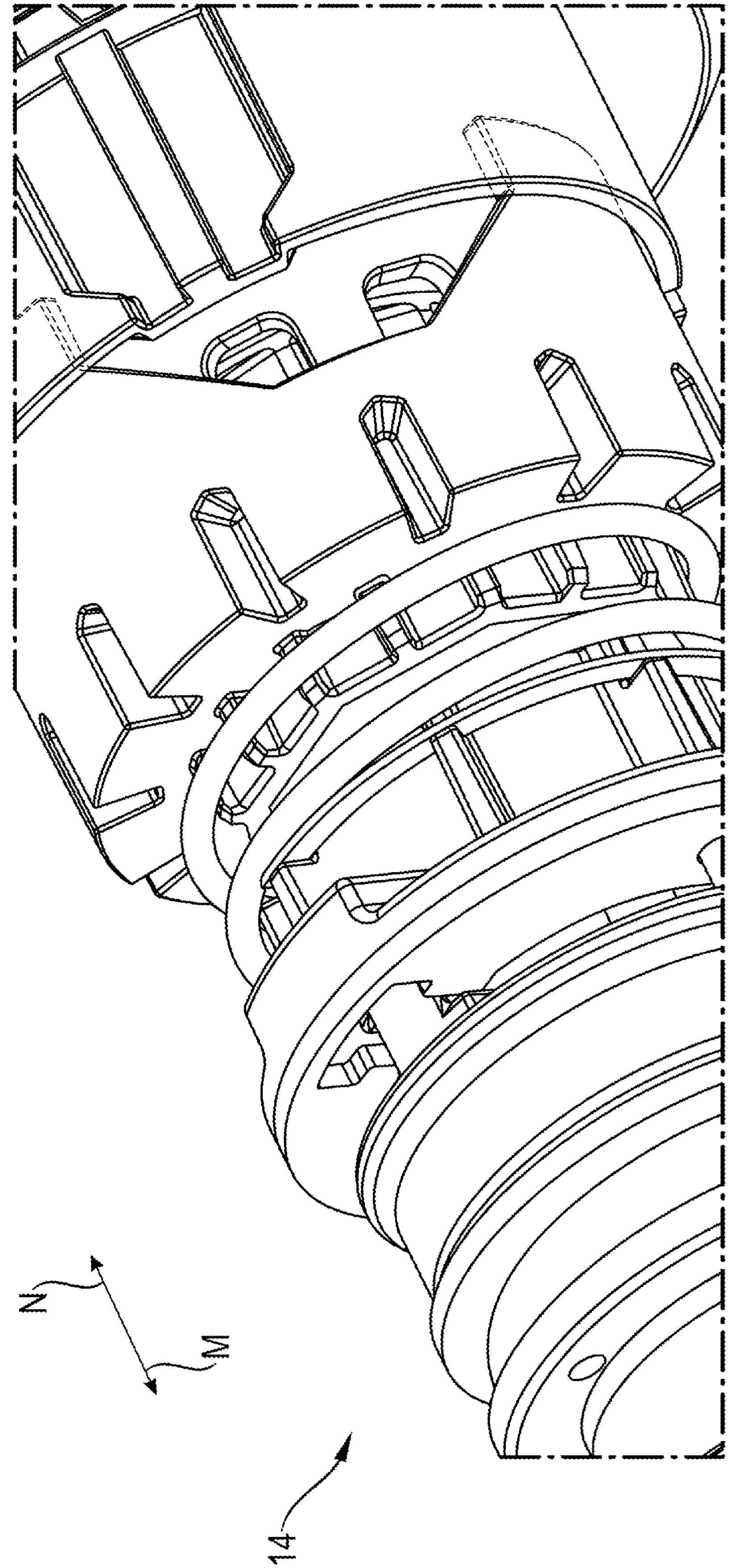
FIG. 22 shows a further detail view of the impact-mechanism housing having the connecting device and of the coupling element having the attachment device.
Figure 23:
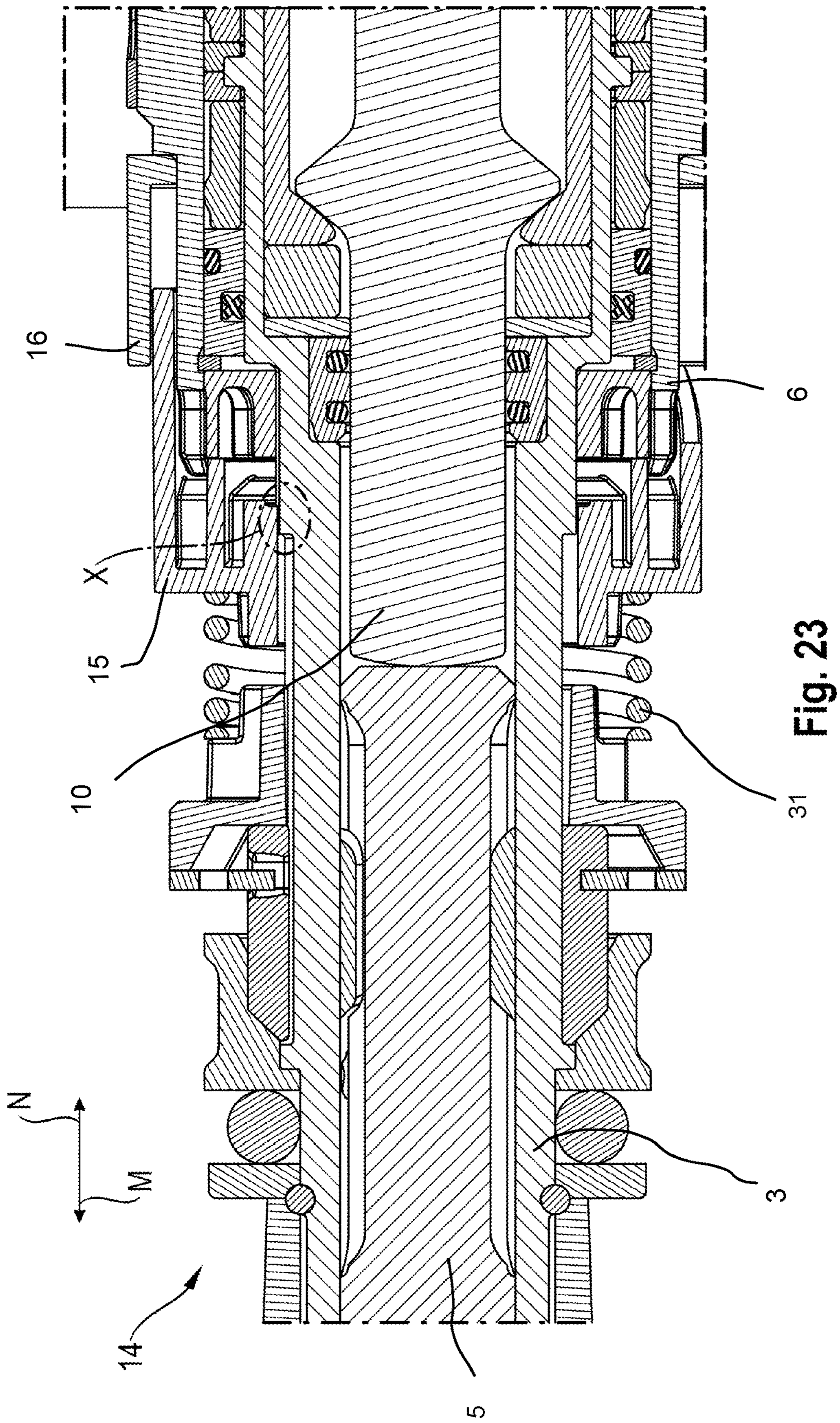
FIG. 23 shows a lateral sectional view of the tool-fitting device without an actuating cap and with the impact-mechanism housing and the coupling element in a separated state.

As is apparent from FIGS. 20 and 23, in a mounted or assembled state, the tool-fitting element 3 is connected to the coupling element 15 such that the octagonal region 3*d* of the first portion 3*a* of the tool-fitting element 3 is positioned in the octagonal cutout 25 in the coupling element 15. In particular in FIG. 20, the coupling element 15 is illustrated in a first position in which the coupling element 15 is connected to the tool-fitting element 3 for conjoint rotation. In FIG. 22, the coupling element 15 is illustrated in a second position in which the coupling element 15 is not connected to the tool-fitting element 3 for conjoint rotation and the coupling element 15 and the tool-fitting element 3 can be turned relative to one another.

Furthermore, the uncoupling element 16 is connected to the impact-mechanism housing 6 such that the toothing or teeth of the connecting device 11 of the impact-mechanism housing 6 is/are engaged with the toothing or teeth of the attachment device 23 of the coupling element 15 so that there is a connection for conjoint rotation between the impact-mechanism housing 6 and the coupling element 15 when the impact-mechanism housing 6 and the coupling element 15 are arranged at a certain axial spacing from one another. In FIG. 20, the impact-mechanism housing 6 and the coupling element 15 are illustrated at a first axial spacing from one another such that there is tooth engagement or a releasable connection between the connecting device 11 of the impact-mechanism housing 6 and the attachment device 23 of the coupling element 15. Since the impact-mechanism housing 6 is connected to the power-tool housing 2 of the power tool 1 for conjoint rotation, the coupling element 15 is also positioned for conjoint rotation inside the power-tool housing 2 of the power tool 1 when there is a connection for conjoint rotation between the connecting device 11 of the impact-mechanism housing 6 and the attachment device 23 of the coupling element 15.

As shown in FIGS. 20 to 23, the coupling element 15, the uncoupling element 16, the tool-fitting element 3, and the front end 6*a* of the impact-mechanism housing 6 are positioned inside the actuating cap 13. A pressing element 30 and a compression spring element 31 are furthermore contained inside the actuating cap 13. The pressing element 30 is located at an axial spacing in the axial direction M in front of the coupling element 15. The compression spring element 31 is positioned between the pressing element 30 and the coupling element 15 such that the spring force of the compression spring element 31 acts between the pressing element 30 and the coupling element 15 and thus pushes the pressing element 30 and the coupling element 15 apart in the axial direction M, N. At the same time, the coupling element 15 is pushed in the axial direction N onto the uncoupling element 16. In order to move the coupling element 15 in the axial direction M, the spring force of the compression spring element 31 is counteracted.

As already described above, the uncoupling element 16 is positioned in the actuating cap 13 such that the pairs of longitudinal ribs 29 on the third portion 13*c* of the actuating cap 13 engage in the recesses in the outer lateral face of the uncoupling element 16, cf. FIG. 15. Furthermore, the coupling element 15 is positioned in the actuating cap 13 such that the elongate elevations 20 on the second portion 13*b* of the actuating cap 13 are engaged with the recesses 15*c* at the front end 15*a* of the coupling element 15, such that there is a connection for conjoint rotation but allowing movement in the axial direction M, N between the actuating cap 13 and the coupling element 15.

In order to actuate the apparatus 14 for selectively turning the tool-fitting element 3, with the result that it is possible to turn the tool-fitting element 3 in the direction of rotation R about the axis of rotation Q, the actuating cap 13 is rotated about the axis of rotation Q. As a result of the third portion 13*c* of the actuating cap 13 being connected to the uncoupling element 16 for conjoint rotation, the uncoupling element 16 is also rotated about the axis of rotation Q. The actuating cap 13 is rotated as far about the axis of rotation Q as the tool-fitting element 3 is intended to be rotated about the axis of rotation Q.

When the uncoupling element 16 is rotated about the axis of rotation Q, the contact face 28*a* of the respective chamfer 28 of the three elevations 27 on the inner lateral face of the uncoupling element 16 presses in the axial direction M against the correspondingly obliquely extending side faces 22*a* (shoulders) of the elevations 22 of the coupling element 15. As a result, by means of the uncoupling element 16, the coupling element 15 is caused to rotate about the axis of rotation Q and is pushed in the axial direction M. As a result of the coupling element 15 being displaced in the axial direction M, the toothings of the connecting device 11 of the impact-mechanism housing 6 and of the attachment device 23 of the coupling element 15 are separated. As is apparent from FIG. 23, a connection for conjoint rotation, or a form-fitting connection, remains in the region X between the coupling element 15 and the tool-fitting element 3, even when the coupling element 15 and the impact-mechanism housing 6 are no longer connected for conjoint rotation.

Figure 21:
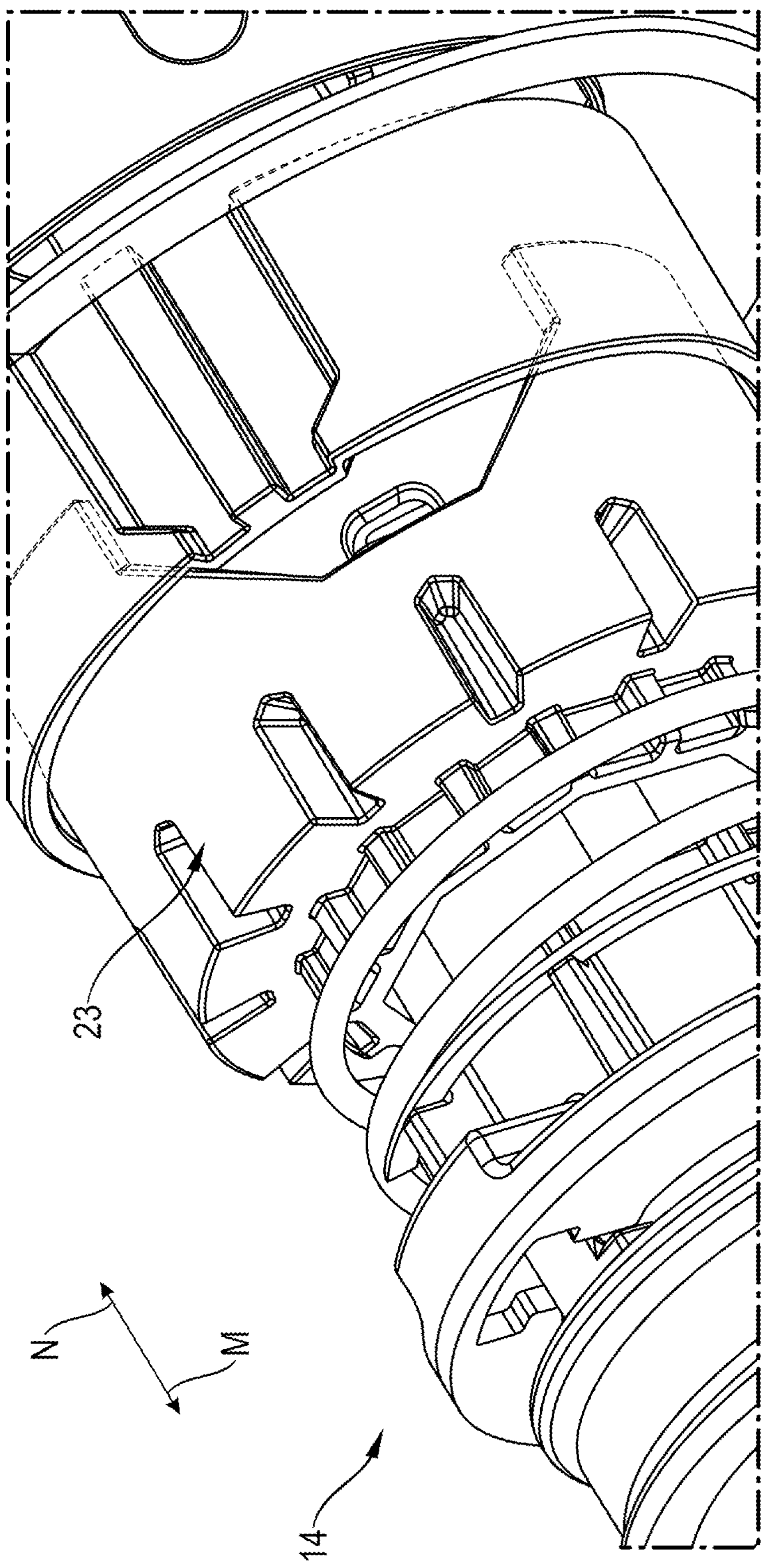
FIG. 21 shows a detail view of the impact-mechanism housing having the connecting device and of the coupling element having the attachment device.

FIG. 21 shows the connecting device 11 of the impact-mechanism housing 6 and the attachment device 23 of the coupling element 15 in a state in which the connecting device 11 and the attachment device 23 are already at a certain axial spacing from one another but complete separation of the toothings of the connecting device 11 and of the attachment device 23 has not yet been achieved. The coupling element 15 has been rotated a certain amount in the direction of rotation R about the axis of rotation Q. By contrast, FIG. 22 shows the connecting device 11 and the attachment device 23 spaced apart further in the axial direction M at a greater axial spacing from one another than in FIG. 21. The coupling element 15 has been rotated a further amount in the direction of rotation R about the axis of rotation Q in FIG. 22. The respective tips of the teeth of the toothings of the connecting device 11 and of the attachment device 23 are located virtually directly opposite one another. In this state, the coupling element 15 presses in the axial direction M, N against the compression spring element 31 such that the compression spring element 31 is compressed to a certain extent. The spring force of the compression spring element 31 acts in the axial direction N counter to the coupling element 15. When the coupling element 15 is rotated further in the direction of rotation R about the axis of rotation Q by means of the uncoupling element 16, the tips of the teeth of the connecting device 11 and of the attachment device 23 are no longer located opposite one another, and, as a result of the spring force of the compression spring element 31, the coupling element 15 is put into a new orientation, rotated about the axis of rotation Q, with respect to the impact-mechanism housing 6. The coupling element 15 and the tool-fitting element 3 connected to the coupling element 15 for conjoint rotation, together with the tool 5 located in the tool-fitting element 3, have now been rotated about the axis of rotation Q relative to the impact-mechanism housing 6, such that, as a result, the tool 5 configured as a chisel is positioned in a changed orientation with respect to the power tool 1.

As is apparent from FIG. 20, the actuating cap 13 contains a first and a second ventilation duct 41, 42 through which an air flow LS for cooling the internal volume of the actuating cap 13 can flow in an axial direction M. The air flow LS can also be referred to as fluid. Furthermore, the actuating cap 13, as shown in particular in FIGS. 1 and 2, contains a first and a second outflow opening 43, 44. The first outflow opening 43 is positioned between the first and second cylindrical portions 13*a*, 13*b* of the actuating cap 13 and the second outflow opening 44 is positioned between the second and third cylindrical portions 13*b*, 13*c* of the actuating cap 13. Through the first and second outflow openings 43, 44, the air flow LS can flow out of the actuating cap 13. The first outflow opening 43 represents the end of the first ventilation duct 41 and the second outflow opening 44 represents the end of the second ventilation duct 42. If, as mentioned above, the actuating cap 13, according to an alternative embodiment, is configured as a single component, the actuating cap 13 contains only one ventilation duct and therefore also only one outflow opening.

What is claimed is:

1. A power tool comprising:

a tool-fitter for receiving and holding a tool; and an apparatus for selectively turning the tool-fitter, the apparatus including at least one constituent of an impact-mechanism housing;

a coupler; and an uncoupler for reversibly separating the coupler from the impact-mechanism housing;

the coupler being settable reversibly in a first position or a second position, and wherein, in the first position, the coupler is connected releasably to the impact-mechanism housing such that the tool-fitter is prevented from turning about an axis of rotation and, in the second position, the coupler is movable relative to the impact-mechanism housing such that the tool-fitter is able to be turned about the axis of rotation relative to the impact-mechanism housing;

wherein the at least one constituent of the impact-mechanism housing includes a connector and the coupler contains an attachment corresponding to the connector such that, as a result of the connector being reversibly connected to the attachment, the coupler is releasably connected to the at least one constituent of the impact-mechanism housing; and wherein a threading is contained between the uncoupler and the coupler such that, as a result of the uncoupler being rotated about the axis of rotation, the coupler is moved at least to such an extent in an axial direction that the connector and the attachment are separated from one another and the coupler together with the tool-fitter are able to be turned relative to the impact-mechanism housing.

2. The power tool as recited in claim 1 wherein both the connector and the corresponding attachment are configured in the form of a toothing.

3. The power tool as recited in claim 1 further comprising an actuating cap configured such that, in a mounted state, the at least one constituent of the impact-mechanism housing, the coupler and the uncoupler are able to be received inside the actuating cap, and as a result of the actuating cap being rotated about the axis of rotation, the uncoupler is rotated about the axis of rotation.

4. The power tool as recited in claim 3 wherein the actuating cap includes a holding sleeve and an unlocking sleeve, the unlocking sleeve turnable about the axis of rotation relative to the holding sleeve and the unlocking sleeve connected to the uncoupler for conjoint rotation such that, as a result of the unlocking sleeve being rotated about the axis of rotation, the uncoupler is also rotated about the axis of rotation.

5. The power tool as recited in claim 3 wherein the actuating cap includes at least one ventilation duct, an air flow for cooling an internal volume of the actuating cap flowable in an axial direction through the at least one ventilation duct.

6. The power tool as recited in claim 3, further comprising the tool, the tool being a chisel.

7. A chipping hammer comprising the power tool as recited in claim 1.

8. A power tool comprising:

a tool-fitter for receiving and holding a tool; and an apparatus for selectively turning the tool-fitter, the apparatus including at least one constituent of an impact-mechanism housing;

a coupler;

an uncoupler for reversibly separating the coupler from the impact-mechanism housing;

the coupler being settable reversibly in a first position or a second position, and wherein, in the first position, the coupler is connected releasably to the impact-mechanism housing such that the tool-fitter is prevented from turning about an axis of rotation and, in the second position, the coupler is movable relative to the impact-mechanism housing such that the tool-fitter is able to be turned about the axis of rotation relative to the impact-mechanism housing; and an actuating cap configured such that, in a mounted state, the at least one constituent of the impact-mechanism housing, the coupler and the uncoupler are able to be received inside the actuating cap, and as a result of the actuating cap being rotated about the axis of rotation, the uncoupler is rotated about the axis of rotation.

9. The power tool as recited in claim 8 wherein the actuating cap includes a holding sleeve and an unlocking sleeve, the unlocking sleeve turnable about the axis of rotation relative to the holding sleeve and the unlocking sleeve connected to the uncoupler for conjoint rotation such that, as a result of the unlocking sleeve being rotated about the axis of rotation, the uncoupler is also rotated about the axis of rotation.

10. The power tool as recited in claim 8 wherein the actuating cap includes at least one ventilation duct, an air flow for cooling an internal volume of the actuating cap flowable in an axial direction through the at least one ventilation duct.

11. The power tool as recited in claim 8, further comprising the tool, the tool being a chisel.

* * * * *